US011530038B2

(12) United States Patent
Wang et al.

(10) Patent No.: US 11,530,038 B2
(45) Date of Patent: Dec. 20, 2022

(54) DETACHABLE PROTECTION STRUCTURE FOR UNMANNED AERIAL SYSTEMS

(71) Applicant: Hangzhou Zero Zero Technology Co., Ltd., Zhejiang (CN)

(72) Inventors: Zhaozhe Wang, Zhejiang (CN); Tong Zhang, Zhejiang (CN)

(73) Assignee: Hangzhou Zero Zero Technology Co., Ltd

( * ) Notice: Subject to any disclaimer, the term of this patent is extended or adjusted under 35 U.S.C. 154(b) by 380 days.

(21) Appl. No.: 16/646,520

(22) PCT Filed: Aug. 20, 2019

(86) PCT No.: PCT/CN2019/101557
§ 371 (c)(1),
(2) Date: Mar. 11, 2020

(87) PCT Pub. No.: WO2020/038356
PCT Pub. Date: Feb. 27, 2020

(65) Prior Publication Data
US 2020/0269978 A1    Aug. 27, 2020

Related U.S. Application Data

(60) Provisional application No. 62/722,411, filed on Aug. 24, 2018.

(51) Int. Cl.
*B64C 39/02* (2006.01)
*B64C 27/00* (2006.01)
*B64C 27/20* (2006.01)

(52) U.S. Cl.
CPC .......... *B64C 39/024* (2013.01); *B64C 27/006* (2013.01); *B64C 27/20* (2013.01); *B64C 2201/027* (2013.01); *B64C 2201/108* (2013.01)

(58) Field of Classification Search
CPC ..... B64C 39/024; B64C 27/006; B64C 27/08; B64C 27/32; B64C 2201/027; B64C 2201/108
See application file for complete search history.

(56) References Cited

U.S. PATENT DOCUMENTS 4,043,421 A * 8/1977 Smith ................. B64C 27/20
180/117
4,880,071 A * 11/1989 Tracy ................. B64C 29/0033
244/12.3
(Continued)

FOREIGN PATENT DOCUMENTS

| CN | 206569265 U | 10/2017 |
| CN | 206704536 U | 12/2017 |

(Continued)

OTHER PUBLICATIONS

International Search Report and Written Opinion (PCT/CN2019/101557); dated Nov. 19, 2019; 10 pages.

*Primary Examiner* — Medhat Badawi
(74) *Attorney, Agent, or Firm* — Endurance Law Group PLC

(57) ABSTRACT

An assembly for an aerial system includes a wing support foldably connected to a first and second side of a body of the aerial system, a protection structure coupled to the wing support and disposed over propellers coupled to the wing support, wherein at least one of the protection structure and the wing support includes at least one of a positioning hook and a positioning groove, wherein the protection structure and wing support are fixed relative to each other with the at least one of the positioning hook and the positioning groove.

18 Claims, 22 Drawing Sheets

(56) References Cited

U.S. PATENT DOCUMENTS

| | | | | |
|---|---|---|---|---|
| 5,672,086 | A * | 9/1997 | Dixon | A63H 27/00 446/37 |
| 6,260,796 | B1 * | 7/2001 | Klingensmith | B64C 27/08 244/17.11 |
| 7,252,265 | B2 * | 8/2007 | Perlo | H04M 1/21 244/17.23 |
| 7,275,712 | B2 * | 10/2007 | Yoeli | B64C 29/0025 244/23 D |
| 8,133,089 | B2 * | 3/2012 | Amireh | A63H 29/22 446/57 |
| 8,342,441 | B2 * | 1/2013 | Yoeli | B64C 29/0033 244/17.11 |
| 8,496,200 | B2 * | 7/2013 | Yoeli | B64C 29/0025 244/23 B |
| 8,833,692 | B2 * | 9/2014 | Yoeli | B64C 29/0025 244/23 A |
| 9,004,973 | B2 * | 4/2015 | Condon | A63H 13/00 446/37 |
| 9,045,226 | B2 * | 6/2015 | Piasecki | B64C 27/32 |
| 9,308,425 | B2 * | 4/2016 | Choi | A63B 65/08 |
| 10,035,589 | B2 * | 7/2018 | Zhang | B64C 27/08 |
| 10,118,696 | B1 * | 11/2018 | Hoffberg | B64C 39/001 |
| RE47,176 | E * | 12/2018 | Rehkemper | B64C 27/14 |
| 10,239,615 | B2 * | 3/2019 | Duru | B64C 27/20 |
| 10,525,832 | B2 * | 1/2020 | Zhao | B60L 53/80 |
| 10,719,080 | B2 * | 7/2020 | Zhang | G05D 1/0088 |
| 10,780,979 | B2 * | 9/2020 | Oberndorfer | B64C 39/024 |
| 10,824,167 | B2 * | 11/2020 | Qu | G05D 1/0033 |
| D906,170 | S * | 12/2020 | Thompson | D12/16.1 |
| 11,027,584 | B1 * | 6/2021 | Kiceniuk, Jr. | B64C 3/56 |
| 11,027,833 | B2 * | 6/2021 | Zhang | B64C 27/14 |
| 11,067,164 | B2 * | 7/2021 | Henion | F16H 59/10 |
| 11,241,925 | B2 * | 2/2022 | Vadekeetil | B60R 19/52 |
| 2008/0048065 | A1 * | 2/2008 | Kuntz | B64C 37/00 244/17.23 |
| 2014/0061362 | A1 * | 3/2014 | Olm | B64C 37/00 244/2 |
| 2014/0061376 | A1 * | 3/2014 | Fisher | B64D 27/00 244/62 |
| 2014/0374532 | A1 * | 12/2014 | Duffy | B64C 37/02 244/2 |
| 2015/0321755 | A1 * | 11/2015 | Martin | B64C 27/50 244/17.23 |
| 2016/0023755 | A1 * | 1/2016 | Elshafei | B64C 39/024 244/17.23 |
| 2016/0122015 | A1 * | 5/2016 | Hutson | B64C 39/024 244/17.23 |
| 2016/0176520 | A1 * | 6/2016 | Goldstein | B64C 39/024 244/17.23 |
| 2016/0200415 | A1 * | 7/2016 | Cooper | B64C 39/024 244/17.15 |
| 2016/0207368 | A1 * | 7/2016 | Gaonjur | B64C 37/00 |
| 2016/0221671 | A1 * | 8/2016 | Fisher | B64C 39/02 |
| 2016/0229534 | A1 * | 8/2016 | Hutson | B64C 39/024 |
| 2016/0286128 | A1 * | 9/2016 | Zhou | H04L 65/1069 |
| 2016/0340021 | A1 * | 11/2016 | Zhang | B64C 27/08 |
| 2016/0340035 | A1 * | 11/2016 | Duru | B64C 39/026 |
| 2016/0378108 | A1 * | 12/2016 | Paczan | B64D 31/06 705/330 |
| 2017/0152060 | A1 * | 6/2017 | Morisawa | H04N 5/2253 |
| 2017/0185084 | A1 * | 6/2017 | Wang | G05D 1/0016 |
| 2017/0225782 | A1 * | 8/2017 | Kohstall | B64C 1/063 |
| 2017/0225783 | A1 * | 8/2017 | Fisher | B64C 39/024 |
| 2018/0319496 | A1 * | 11/2018 | Zhang | B64C 39/024 |
| 2020/0140080 | A1 * | 5/2020 | Regev | B64C 9/02 |
| 2020/0269978 | A1 * | 8/2020 | Wang | B64C 27/006 |
| 2021/0024213 | A1 * | 1/2021 | Regev | B64C 27/28 |

FOREIGN PATENT DOCUMENTS

| | | |
|---|---|---|
| CN | 206734619 U | 12/2017 |
| CN | 206871353 U | 1/2018 |
| CN | 207173957 U | 4/2018 |
| CN | 207242029 U | 4/2018 |
| CN | 108058818 A | 5/2018 |
| CN | 108082484 A | 5/2018 |
| CN | 108177774 A | 6/2018 |
| KR | 10-1858009 B1 | 5/2018 |

* cited by examiner

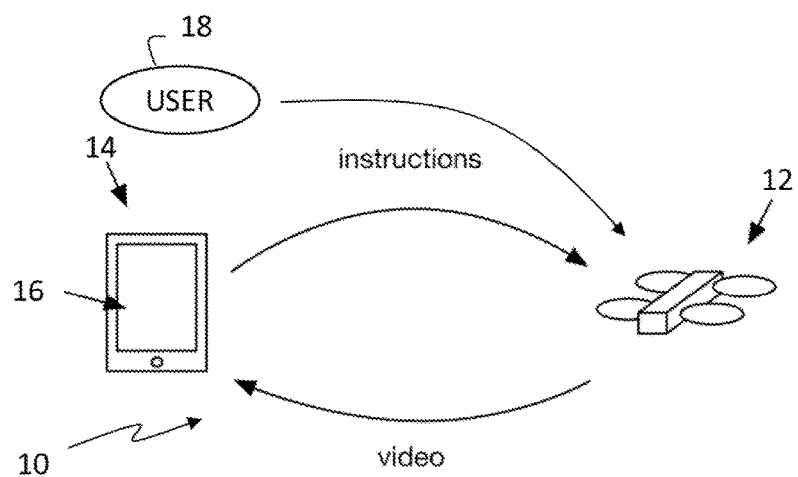
FIGURE 1
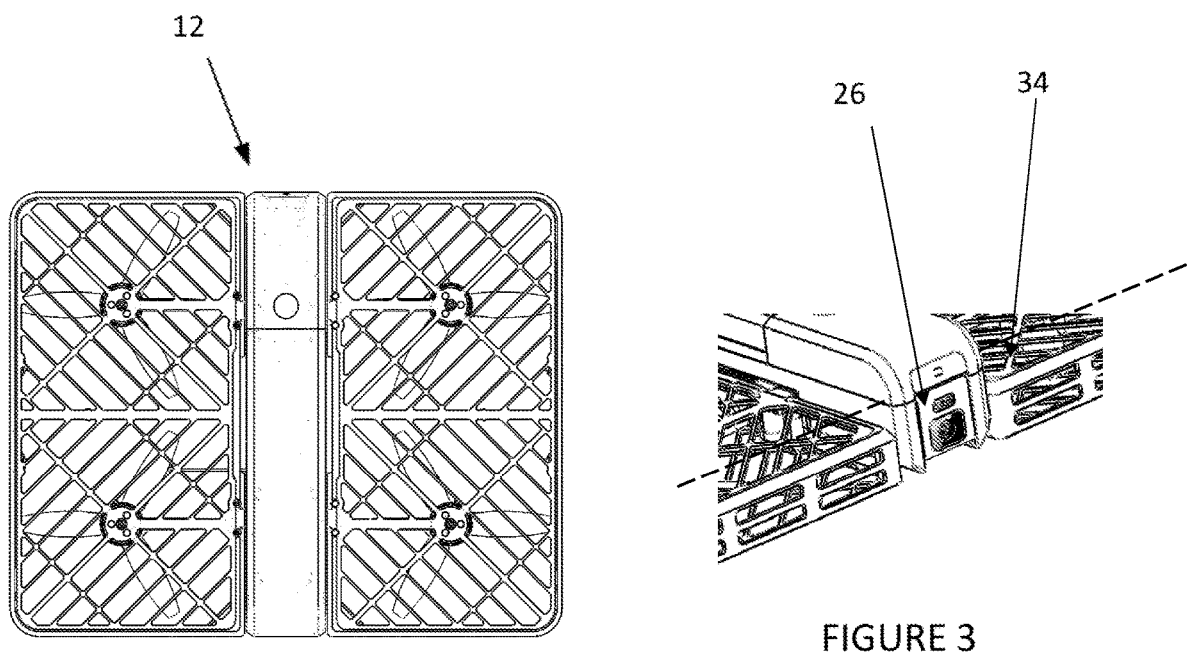
FIGURE 2
FIGURE 3

US 11,530,038 B2

DETACHABLE PROTECTION STRUCTURE FOR UNMANNED AERIAL SYSTEMS

CROSS-REFERENCE TO RELATED APPLICATION(S)

This application is a national phase of International Application No. PCT/CN2019/101557, filed Aug. 20, 2019, which claims the benefit of U.S. Provisional Patent Application Ser. No. 62/722,411, filed on Aug. 24, 2018, the entire disclosures of which are hereby incorporated by reference for all purposes.

TECHNICAL FIELD

This invention relates generally to a protection structure for aerial systems, and more specifically, to a detachable protection structure for an unmanned aerial system.

BACKGROUND OF THE INVENTION

A pilotless aerial robot or unmanned aerial vehicle (UAV) or system is often referred to as a "drone" that is manipulated by radio remote control equipment and its own program control device. No cockpit is mounted on the UAV, but an autopilot, the program control device, a signal collection device, and other equipment are installed thereon. Personnel on the ground carry out tracking, positioning, remote control, telemetering, and digital transmission on the UAV by radar and other equipment.

The UAV without a protection structure has poor safety performance. For unmanned aerial vehicles with a protection structure, the installation and dismantling of the protection structure are complex and the volume of the protection structure is large thus making it inconvenient for storage. For unmanned aerial vehicles with a protection structure, it is non-trivial for the UAV system to automatically identify the scenarios when the protection structure is mounted on/disassembled from the UAV, which makes it a challenging task for the UAV flight control system to apply the correct physical model and flight control strategies for both scenarios mentioned above.

The present invention is aimed at one or more of the problems identified above.

SUMMARY OF THE INVENTION

The present invention provides an assembly for an aerial system including a wing support connected to a first and second side of a body of the aerial system and a protection structure coupled to the wing support and disposed over propellers coupled to the wing support. At least one of the protection structure and the wing support includes at least one positioning hook and positioning groove. The protection structure and wing support are fixed relative to each other with the at least one positioning hook and positioning groove.

The present invention also provides a lift mechanism for an aerial system including a folding mechanism adapted to be connected to a first and second side of a body of the aerial system, a wing support coupled to the folding mechanism, a propeller blade and motor coupled to the wing support, and a protection structure disposed over the propeller blade and removably attached to the wing support. At least one of the protection structure and the wing support includes at least one positioning hook and positioning groove, the protection structure and wing support being fixed relative to each other with the at least one positioning hook and positioning groove.

BRIEF DESCRIPTION OF THE FIGURES

FIG. 1 is a schematic representation of an aerial system and a system for controlling the aerial system, according to an embodiment of the present invention.

FIG. 2 is a plan view of an exemplary aerial system, according to an embodiment of the present invention.

FIG. 3 is a perspective view of an exemplary optical system, according to an embodiment of the present invention.

DETAILED DESCRIPTION OF THE INVENTION

Figure 4:
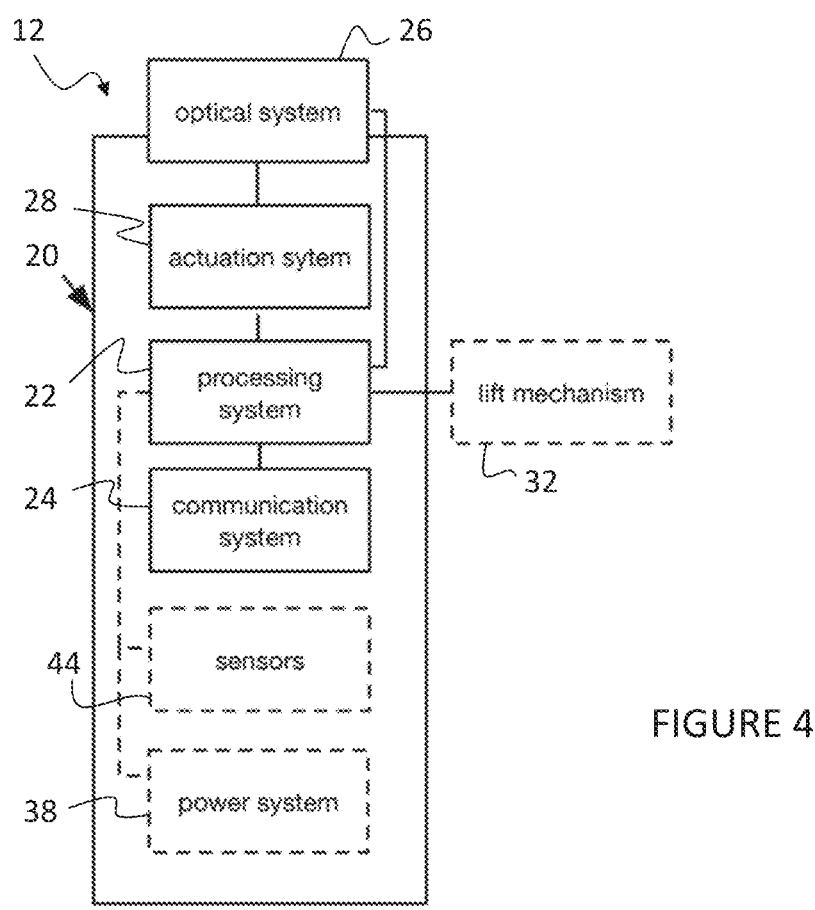
FIG. 4 is a second schematic representation of the aerial system, according to an embodiment of the present invention.

The following description of the embodiments of the present invention is not intended to limit the present invention to these embodiments, but rather to enable any person skilled in the art to make and use this invention. With reference to the drawings and in operation, a system 10 for controlling an unmanned aerial vehicle (UAV) or aerial system 12, for example a drone, is provided. The system 10 includes a remote device 14 with a control client 16. The control client 16 provides a user interface that allows a user 18 to send instructions to the aerial system 12 to control operation thereof. In one embodiment, the aerial system 12 may include one or more cameras for obtaining pictures and/or video which may be sent to the remote device 14 and/or stored in memory on the aerial system 12.

Alternatively, or in addition, the aerial system 12 may include one or more sensors for detecting or sensing operations or actions, i.e., expressions, performed by the user 18 to control operation of the aerial system 12 without direct or physical interaction with the remote device 14. In controller-free embodiments, the entire control loop from start (release and hover) to finish (grab and go), as well as controlling motion of the aerial system 12 and trigger of events, e.g., taking pictures and video, are performed solely on board the aerial system 12 without involvement of the remote device 14. In some such embodiments or systems 10, a remote device 14 may not be provided or included.

In some embodiments, the remote device 14 includes one or more sensors that detect or sense operation or actions performed by the user 18 to control operation of the aerial system 12 without physical interaction with the remote device 14 under certain conditions, for example, when the aerial system 12 is too far from the user 18.

Overview of the System 10 and the Aerial System 12

An exemplary aerial system 12 and control system 10 is shown in FIGS. 1-5. The control client 16 of the aerial system 12 functions to receive data from the aerial system 12, including video images and/or video, and control visual display on the remote device 14. The control client 16 may also receive operation instructions and facilitate remote control of the aerial system 12 based on operation instructions. The control client 16 is preferably configured to execute on the remote device 14, but can alternatively be configured to execute on the aerial system 12 or on any other suitable system. As discussed above, the aerial system 12 may be controlled solely without direct or physical interaction with the remote device 14.

The control client 16 can be a native application (e.g., a mobile application), a browser application, an operating system application, or be any other suitable construct.

The remote device 14 executing the control client 16 functions to display the data (e.g., as instructed by the control client 16), receive user inputs, compute the operation instructions based on the user inputs (e.g., as instructed by the control client 16), send operation instructions to the aerial system 12, store control client information (e.g., associated aerial system identifiers, security keys, user account information, user account preferences, etc.), or perform any other suitable functionality. The remote device 14 can be a user device (e.g., smartphone, tablet, laptop, etc.), a networked server system, or be any other suitable remote computing system. The remote device 14 can include one or more: outputs, inputs, communication systems, sensors, power sources, processing systems (e.g., CPU, memory, etc.), or any other suitable component. Outputs can include: displays (e.g., LED display, OLED display, LCD, etc.), audio speakers, lights (e.g., LEDs), tactile outputs (e.g., a tixel system, vibratory motors, etc.), or any other suitable output. Inputs can include: touchscreens (e.g., capacitive; resistive, etc.), a mouse; a keyboard, a motion sensor, a microphone, a biometric input, a camera, or any other suitable input. Communication systems can include wireless connections, such as radios supporting: long-range systems (e.g., Wi-Fi, cellular, WLAN, WiMAX, microwave, IR, radio frequency, etc.), short-range systems BLE, BLE long range, NFC, ZigBee, RF, audio, optical, etc.), or any other suitable communication system. Sensors can include: orientation sensors (e.g., accelerometer, gyroscope, etc.), ambient light sensors, temperature sensors, pressure sensors, optical sensors, acoustic sensors, or any other suitable sensor. In one variation; the remote device 14 can include a display (e.g., a touch-sensitive display including a touchscreen overlaying the display), a set of radios (e.g., cellular, BLE, etc.), and a set of orientation sensors. However, the remote device 14 can include any suitable set of components.

The aerial system 12 functions to fly within a physical space, capture video, stream the video in near-real time to the remote device 14, and operate based on operation instructions received from the remote device 14.

The aerial system 12 can additionally process the video (e.g., video frames) prior to streaming the video to the remote device 14 and/or audio received from an onboard audio sensor, generate and automatically operate based on its own operation instructions (e.g., to automatically follow a subject), or perform any other suitable functionality. The aerial system 12 can additionally function to move the optical sensor's field of view within the physical space. For example, the aerial system 12 can control macro movements (e.g., large FOV changes, on the order of meter adjustments), micro movements (e.g., small FOV changes, on the order of millimeter or centimeter adjustments), or any other suitable movement.

As discussed in more detail below, the aerial system 12 can perform certain functionality based on onboard processing of sensor data from onboard sensors. This functionality may include, but is not limited to:

Take-off and landing;
Owner recognition;
Facial recognition;
Speech recognition;
Facial expression and gesture recognition;
Control, e.g., motion, of the aerial system based on owner, facial, expression and gesture recognition, and speech recognition;
Depth sensing; and
Obstacle avoidance.

As shown in FIGS. 2-5, the aerial system 12 (e.g., drone) can include a body 20, a processing system 22, a communication system 24, an optical system 26, an actuation mechanism 28 mounting the optical system 26 to the body 20, a lift mechanism 40 coupled to the body 20, and a detachable protection structure 42, according to the present invention and to be described, coupled to the body 20. The aerial system 12 can additionally or alternatively include lift mechanisms, sensors, power system, or any other suitable component (see below).

The body 20 of the aerial system 12 functions to mechanically protect and/or retain the components of the aerial system 12. The body 20 can define a lumen, be a platform, or have any suitable configuration. The body 20 can be enclosed, open (e.g., a truss), or have any suitable construction. The body 20 can be made of metal, plastic (e.g., polymer), carbon composite, or any other suitable material. The body 20 can define a longitudinal axis, a lateral axis, a transverse axis; a front end, a back end (e.g., opposing the front end along the longitudinal axis), a top, a bottom (e.g., opposing the top along the transverse axis), or any other suitable reference. In one variation, while in flight, a transverse axis of the body 20 can be substantially parallel to a gravity vector (e.g., perpendicular to a ground plane) and the body's longitudinal and lateral axes can be substantially perpendicular to the gravity vector (e.g., parallel the ground plane). However, the body 20 can be otherwise configured.

The processing system 22 of the aerial system 12 functions to control operation of the aerial system 12. The processing system 22 can receive operation instructions from the communication system 24, interpret the operation instructions into machine instructions, and control components of the aerial system 12 based on the machine instructions (individually or as a set). The processing system 22 can additionally or alternatively process the images recorded by the camera; stream images to the remote device 14 (e.g., in real- or near-real time), or perform any other suitable functionality. The processing system 22 can include one or more: processors 30 (e.g., CPU, GPU, etc.), memory (e.g., Flash, RAM, etc.), or any other suitable processing component. In one variation, the processing system 22 can additionally include dedicated hardware that automatically processes the images (e.g., de-warps the image, filters the image, crops the image, etc.) prior to transmission to the remote device 14. The processing system 22 is preferably connected to the active components of the aerial system 12 and mounted to the body 20, but can alternatively be otherwise related to components of the aerial system 12.

The communication system 24 of the aerial system 12 functions to send and/or receive information from the remote device 14. The communication system 24 is preferably connected to the processing system 22, such that the communication system 24 sends and/or receives data from the processing system 22, but can alternatively be connected to any other suitable component. The aerial system 12 can include one or more communication systems 24 of one or more types. The communication system 24 can include wireless connections, such as radios supporting long-range systems (e.g., WLAN, WiMAX, microwave, IR, radio frequency, etc.), short-range systems (e.g., BLE, BLE long range, NFC, ZigBee, RF, audio, optical, etc.), or any other suitable communication system 24. The communication system 24 preferably shares at least one system protocol (e.g., BLE, RF, etc.) with the remote device 14, but can alternatively communicate with the remote device 14 via an intermediary communication system (e.g., a protocol translation system). However, the communication system 24 can be otherwise configured.

The optical system 26 of the aerial system 12 functions to record images of the physical space proximal the aerial system 12. The optical system 26 is preferably mounted to the body 20 via the actuation mechanism 28, but can alternatively be statically mounted to the body 20, removably mounted to the body 20, or otherwise mounted to the body 20. The optical system 26 is preferably mounted to the front end of the body 20, but can optionally be mounted to the bottom (e.g., proximal the front), top, back end, or any other suitable portion of the body 20. The optical system 26 is preferably connected to the processing system 22, but can alternatively be connected to the communication system 24 or to any other suitable system. The optical system 26 can additionally include dedicated image processing hardware that automatically processes images recorded by the camera prior to transmission to the processor or other endpoint. The aerial system 12 can include one or more optical systems 26 of same or different type, mounted to the same or different position. In one variation, the aerial system 12 includes a first optical system 26, mounted to the front end of the body 20, and a second optical system 26, mounted to the bottom of the body 20. The first optical system 26 can actuate about a pivotal support, and the second optical system 26 can be substantially statically retained relative to the body 20, with the respective active surface substantially parallel to the bottom of the body 20. The first optical sensor 36 can be high-definition, while the second optical sensor 36 can be low definition. However, the optical system 26 can be otherwise configured.

Figure 5:
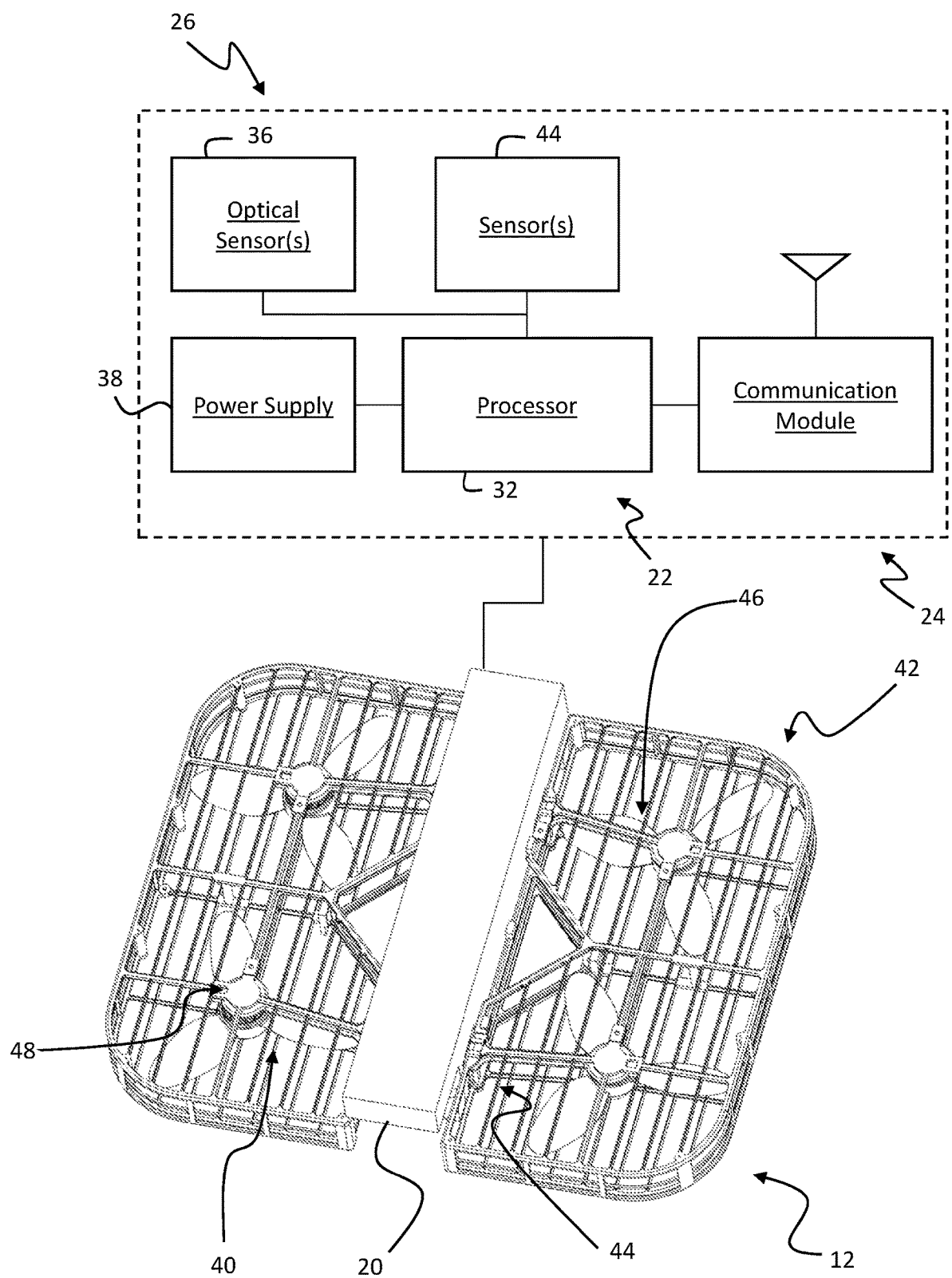
FIG. 5 is a third schematic representation of the system for controlling the aerial system, according to an embodiment of the present invention.

The optical system 26 can include one or more optical sensors 36 (see FIG. 5). The one or more optical sensors 36 can include: a single lens camera (e.g., CCD camera, CMOS camera, etc.), a stereo-camera, a hyperspectral camera, a multispectral camera, or any other suitable image sensor. However, the optical system 26 can be any other suitable optical system 26. The optical system 26 can define one or more active surfaces that receive light, but can alternatively include any other suitable component. For example, an active surface of a camera can be an active surface of a camera sensor (e.g., CCD sensor, CMOS sensor, etc.), preferably including a regular array of sensor pixels. The camera sensor or other active surface is preferably substantially planar and rectangular (e.g., having a first sensor edge, a second sensor edge opposing the first sensor edge, and third and fourth sensor edges each perpendicular to and extending from the first sensor edge to the second sensor edge), but can alternatively have any suitable shape and/or topography. The optical sensor 36 can produce an image frame. The image frame preferably corresponds with the shape of the active surface (e.g., rectangular, having a first and second frame edge opposing each other, etc.), more preferably defining a regular array of pixel locations, each pixel location corresponding to a sensor pixel of the active surface and/or pixels of the images sampled by the optical sensor 36, but can alternatively have any suitable shape. The image frame preferably defines aspects of the images sampled by the optical sensor 36 (e.g., image dimensions, resolution, pixel size and/or shape, etc.). The optical sensor 36 can optionally include a zoom lens, digital zoom, fisheye lens, filter, or any other suitable active or passive optical adjustment. Application of the optical adjustment can be actively controlled by the controller, manually controlled by the user 18 (e.g., wherein the user manually sets the adjustment), controlled by the remote device 14, or otherwise controlled. In one variation, the optical system 26 can include a housing enclosing the remainder of the optical system components, wherein the housing is mounted to the body 20. However, the optical system 26 can be otherwise configured.

The actuation mechanism 28 of the aerial system 12 functions to actionably mount the optical system 26 to the body 20. The actuation mechanism 28 can additionally function to dampen optical sensor vibration (e.g., mechanically stabilize the resultant image), accommodate for aerial system roll, or perform any other suitable functionality. The actuation mechanism 28 can be active (e.g., controlled by the processing system), passive (e.g., controlled by a set of weights, spring elements, magnetic elements, etc.), or otherwise controlled. The actuation mechanism 28 can rotate the optical system 26 about one or more axes relative to the body 20, translate the optical system 26 along one or more axes relative to the body 20, or otherwise actuate the optical system 26. The optical sensor(s) 36 can be mounted to the support along a first end, along an optical sensor back (e.g., opposing the active surface), through the body 20, or along any other suitable portion of the optical sensor 36.

In one variation, the actuation mechanism 28 can include a motor (not shown) connected to a single pivoted support (e.g., gimbal), wherein a motor pivots the support about the rotational (or gimbal) axis 34 based on instructions received from the controller. The support is preferably arranged with the rotational axis substantially parallel to the lateral axis of the body 20 but can alternatively be arranged with the rotational axis at any other suitable orientation relative to the body 20. The support is preferably arranged within a recessed cavity defined by the body 20, wherein the cavity further encompasses the optical sensor 36 but can alternatively be arranged along the body exterior or arranged at any other suitable portion of the body 20. The optical sensor 36 is preferably mounted to the support with the active surface substantially parallel the rotational axis (e.g., with the lateral axis, or axis parallel to the lateral axis of the body 20, substantially parallel to the rotational axis), but can alternatively be arranged with the active surface arranged at any suitable angle to the rotational axis.

The motor is preferably an electric motor, but can alternatively be any other suitable motor. Examples of electric motors that can be used include: DC motors (e.g., brushed motors), EC motors (e.g., brushless motors), induction motor, synchronous motor, magnetic motor, or any other suitable electric motor. The motor is preferably mounted to the body 20 (e.g., the body interior), electrically connected to and controlled by the processing system 22, and electrically connected to and powered by a power source or system 38. However, the motor can be otherwise connected. The actuation mechanism 28 preferably includes a single motor-support set, but can alternatively include multiple motor-support sets, wherein auxiliary motor-support sets can be arranged orthogonal (or at any other suitable angle to) the first motor-support set.

In a second variation, the actuation mechanism 28 can include a set of pivoted supports and weights connected to the optical sensor 36 offset from the optical sensor center of gravity, wherein the actuation mechanism 28 passively stabilizes the optical sensor 36.

The lift mechanism 40 of the aerial system 12 functions to enable aerial system flight. The lift mechanism 40 preferably includes a wing having a foldable mechanism 44, a wing support 46, the detachable protection structure 42 to be described, and a set of propeller blades 48 driven by motors (not shown), but can alternatively include any other suitable propulsion mechanism, on each side of the body 20. The lift mechanism 40 is preferably foldably or pivotally mounted to the body 20 and controlled by the processing system 22, but can alternatively be otherwise mounted to the aerial system 12 and/or controlled. The aerial system 12 can include multiple lift mechanisms 40. In one example, the aerial system 12 may include four lift mechanisms 40 (e.g., two pairs of lift mechanisms 40), wherein the lift mechanisms 40 are substantially evenly distributed about the perimeter of the aerial system 12 (e.g., wherein the lift mechanisms 40 of each pair oppose each other across the body 20). However, the lift mechanisms 40 can be otherwise configured.

Additional sensors 44 of the aerial system 12 function to record signals indicative of operation of the aerial system 12, the ambient environment surrounding the aerial system 12 (e.g., the physical space proximal the aerial system 12), or any other suitable parameter. The sensors 44 are preferably mounted to the body 20 and controlled by the processing system 22, but can alternatively be mounted to any other suitable component and/or otherwise controlled. The aerial system 12 can include one or more sensors 36, 44. Examples of sensors that can be used include: orientation sensors (e.g., accelerometer, gyroscope, etc.), ambient light sensors, temperature sensors, pressure sensors, optical sensors, acoustic sensors (e.g., microphones), voltage sensors, current sensors, ultrasonic sensors, or any other suitable sensor.

The power supply 38 of the aerial system 12 functions to power the active components of the aerial system 12. The power supply 38 is preferably mounted to the body 20, and electrically connected to all active components of the aerial system 12 (e.g., directly or indirectly), but can be otherwise arranged. The power supply 38 can be a primary battery, secondary battery (e.g., rechargeable battery), fuel cell, energy harvester (e.g., solar, wind, etc.), or be any other suitable power supply. Examples of secondary batteries that can be used include: a lithium chemistry (e.g., lithium ion, lithium ion polymer, etc.), nickel chemistry (e.g., NiCad, NiMH, etc. or batteries with any other suitable chemistry.

The power supply 38 of the aerial system 12 functions to power the active components of the aerial system 12 (e.g., motors of the lift mechanisms 40, etc.). The power supply 38 can be mounted to the body 20 and connected to the active components, or be otherwise arranged. The power supply 38 can be a rechargeable battery, secondary battery, primary battery, fuel cell, or be any other suitable power supply.

The sensors 36, 44 of the aerial system 12 function to acquire signals indicative of the ambient environment and/or operation of the aerial system 12. The sensors 36, 44 are preferably mounted to the body 20, but can alternatively be mounted to any other suitable component. The sensors 36, 44 are preferably powered by the power supply 38 and controlled by the processor, but can be connected to and interact with any other suitable component. The sensors 36, 44 can include one or more: cameras (e.g., CCD, CMOS, multispectral, visual range, hyperspectral, stereoscopic, etc.), orientation sensors (e.g., inertial measurement sensors, accelerometer, gyroscope, altimeter, magnetometer, etc.), audio sensors (e.g., transducer, microphone, etc.), barometers, light sensors, temperature sensors, current sensor (e.g., Hall effect sensor), air flow meter, voltmeters, touch sensors (e.g., resistive, capacitive, etc.), proximity sensors, force sensors (e.g., strain gauge meter, load cell), vibration sensors, chemical sensors, sonar sensors, location sensor (e.g., GPS, GNSS, triangulation, etc.), ranging sensors (e.g., ultrasonic) or any other suitable sensor. In one variation, the aerial system 12 includes a first camera mounted (e.g., statically or rotatably) along a first end of the body 20 with a field of view intersecting the lateral plane of the body 20, a second camera mounted along the bottom of the body 20 with a field of view substantially parallel to the lateral plane, and a set of orientation sensors, such as an altimeter and accelerometer. However, the aerial system 12 can include any suitable number of any sensor type.

The processing system 22 of the aerial system 12 functions to control operation of the aerial system 12. The processing system 22 can perform the method, stabilize the aerial system 12 during flight (e.g., selectively operate the propeller blades 48 to minimize wobble in-flight of the aerial system 12), receive, interpret, and operate the aerial system 12 based on remote control instructions, or otherwise control operation of the aerial system 12. The processing system 22 is preferably configured to receive and interpret measurements sampled by the sensors 36, 44, more preferably by combining measurements sampled by disparate sensors (e.g., combining camera and accelerometer data). The aerial system 12 can include one or more processing systems, wherein different processors can perform the same functionality (e.g., function as a multi-core system), or be specialized. The processing system 22 can include one or more: processors (e.g., CPU, GPU, microprocessor, etc.), memory (e.g., Flash, RAM, etc.), or any other suitable component. The processing system 22 is preferably mounted to the body 20, but can alternatively be mounted to any other suitable component. The processing system 22 is preferably powered by the power supply 38, but can be otherwise powered. The processing system 22 is preferably connected to and controls the sensors 36, 44, communication system 24, and lift mechanism 40, but can additionally or alternatively be connected to and interact with any other suitable component.

The communication system 24 of the aerial system 12 functions to communicate with one or more remote computing systems. The communication system 24 can be a long-range communication module, a short-range communication module, or any other suitable communication module. The communication system 24 can facilitate wired and/or wireless communication. Examples of the communication system 24 include an 802.11x, Wi-Fi, Wi-Max, NFC, RFID, Bluetooth, Bluetooth Low Energy, ZigBee, cellular telecommunications (e.g., 2G, 3G, 4G, LIE, etc), radio (RF), wired connection (e.g., USB), or any other suitable communication system 24 or combination thereof. The communication system 24 is preferably powered by the power supply 38, but can be otherwise powered. The communication system 24 is preferably connected to the processing system 22, but can additionally or alternatively be connected to and interact with any other suitable component.

The aerial system 12 can additionally include inputs (e.g., microphones, cameras, etc.), outputs (e.g., displays, speakers, light emitting elements, etc.), or any other suitable component.

The remote computing system functions to receive auxiliary user inputs, and can additionally function to automatically generate control instructions for and send the control instructions to the aerial system(s) 12. Each aerial system 12 can be controlled by one or more remote computing systems. The remote computing system preferably controls the aerial system 12 through a client (e.g., a native application, browser application, etc.), but can otherwise control the aerial system 12. The remote computing system can be a user device, remote server system, connected appliance, or be any other suitable system. Examples of the user device include a tablet, smartphone, mobile phone, laptop, watch, wearable device (e.g., glasses), or any other suitable user device. The user device can include power storage (e.g., a battery), processing systems (e.g., CPU, GPU, memory, etc.), user outputs (e.g., display, speaker, vibration mechanism, etc.), user inputs (e.g., a keyboard, touchscreen, microphone, etc.), a location system (e.g., a GPS system), sensors (e.g., optical sensors, such as light sensors and cameras, orientation sensors, such as accelerometers, gyroscopes, and altimeters, audio sensors, such as microphones, depth sensors such as ultrasonic sensors, etc.), data communication system (e.g., a Wi-Fi module, BLE, cellular module, etc.), or any other suitable component.

The methods described herein may be used with one or more aerial systems 12, and can optionally be used with a remote computing system, or with any other suitable system. The aerial system 12 functions to fly, and can additionally function to take photographs, deliver loads, and/or relay wireless communications. The aerial system 12 is preferably a rotorcraft (e.g., quadcopter, helicopter, cyclocopter, etc.), but can alternatively be a fixed-wing aircraft, aerostat, or be any other suitable aerial system 12. It should be appreciated that the aerial system 12 can include the lift mechanism 40, the power supply 38, the sensors 36, 44, the processing system 22, the communication system 24, the body 20, the detachable protection structure 42, and/or include any other suitable component.

Lift Mechanism and Detachable Protection Structure

Figure 6:
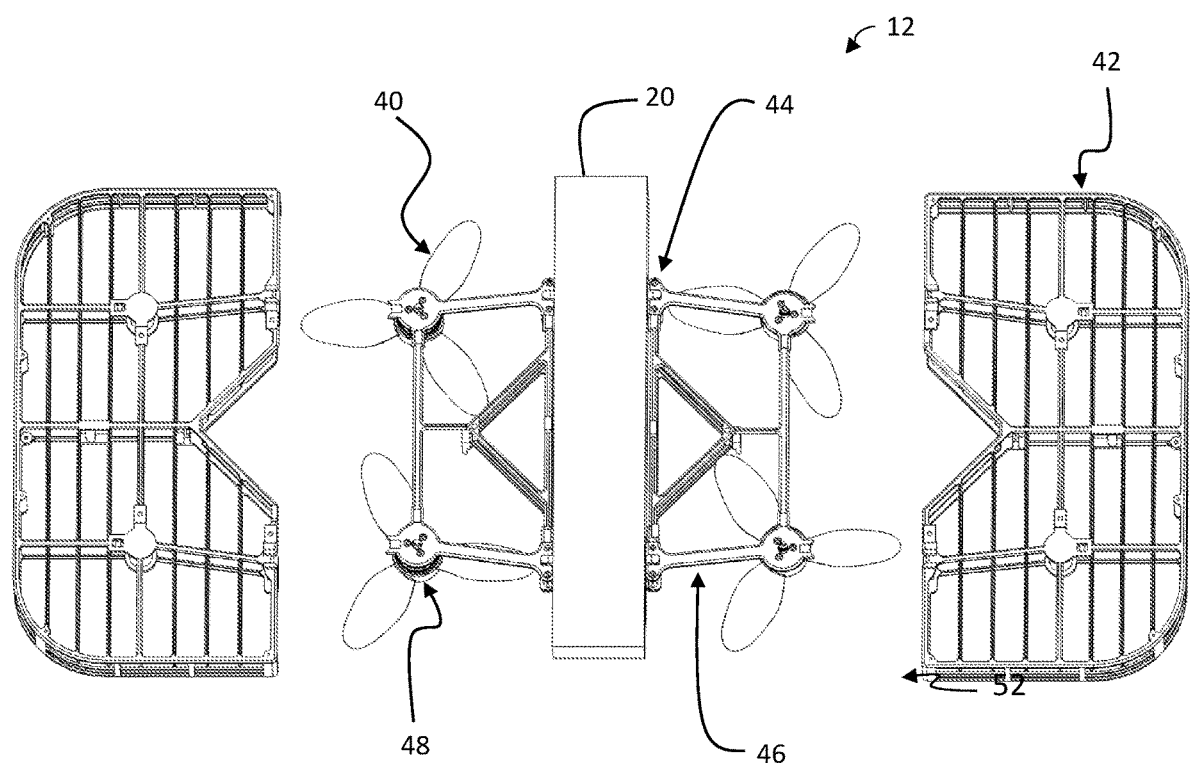
FIG. 6 is an exploded view of a detachable protection structure, according to an embodiment of the present invention, for the aerial system of FIG. 5.

With reference to FIGS. 5-18, and specifically, to FIGS. 5-11, the present invention provides an embodiment of the detachable protection structure 42 for the aerial system 12. The detachable protection structure 42 can be quickly and easily detached from the body 20 or installed onto the body 20 to protect the propeller blades 48. It should be appreciated that the detachable protection structure 42 on both sides of the body 20 can be pulled out laterally and dismantled from the body 20 as illustrated in FIG. 6. It should also be appreciated that the aerial system 12 can automatically recognize the expansion state and folding state of the wings of the lift mechanism 40 to choose proper flight control strategies.

Figure 7:
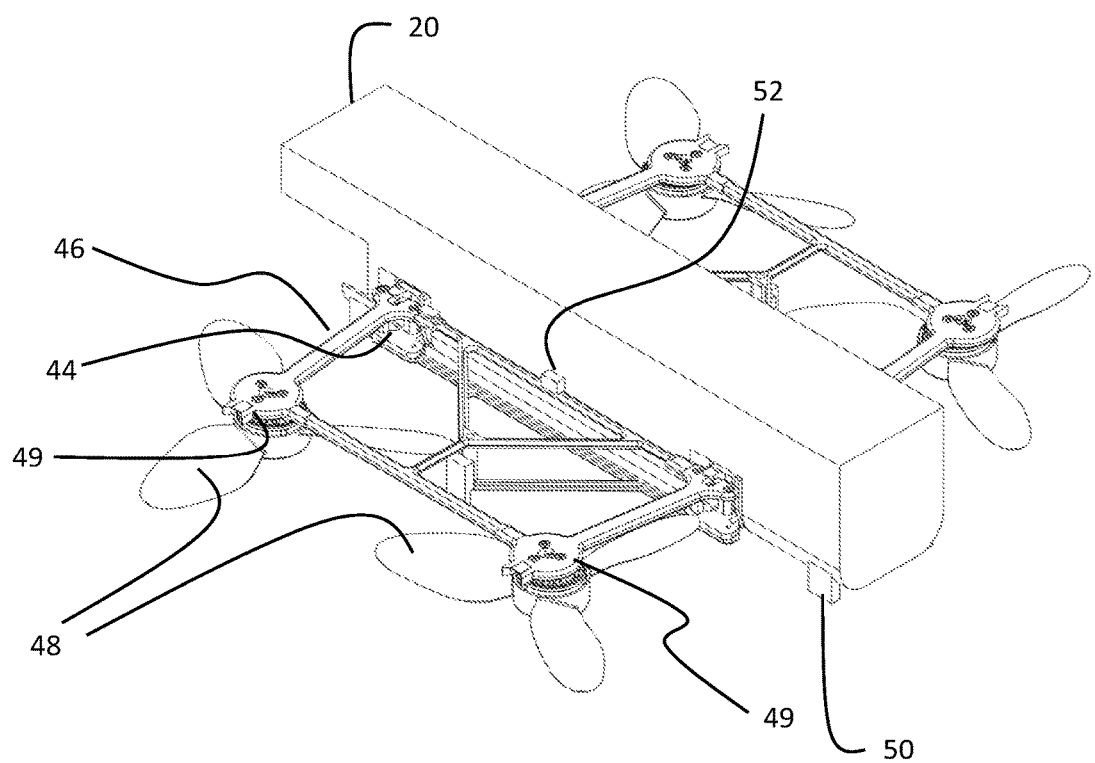
FIG. 7 is a perspective view of the aerial system of FIG. 6 without the detachable protection structure, according to an embodiment of the present invention.

Referring to FIG. 7, the aerial system 12 includes the body 20, the lift mechanism 40 including the wings on each side of the body 20 each having the folding mechanism 44, wing support 46, propeller blades 48 and motor 49, landing gear 50, and one or more magnets 52. The body 20 of the aerial system 12 functions to support the components of the aerial system 12. The body 20 can additionally function to protect the components of the aerial system 12. The body 20 preferably substantially encapsulates the communication system 24, power supply 38, and processing system 22, but can be otherwise configured. The body 20 can include a platform, a housing, or have any other suitable configuration. In one variation, the body 20 includes a main body housing the communication system 24, power supply 38, and processing system 22.

Figure 8:
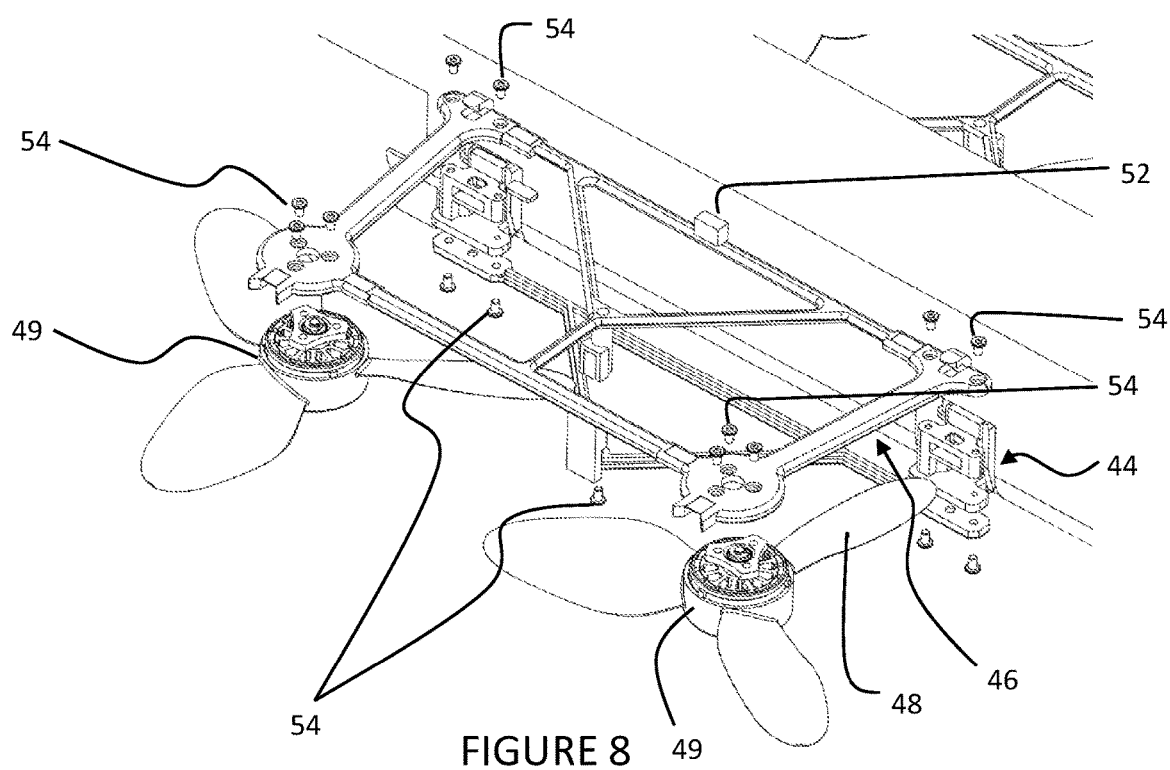
FIG. 8 is an exploded view of a lift mechanism of the aerial system of FIG. 5.

One or more folding mechanisms 44 is connected to the body 20 as illustrated in FIG. 8. In an embodiment, there are four folding mechanisms 44 with two folding mechanisms 44 on each side of the body 20 and longitudinally spaced from each other. Each folding mechanism 44 has a first portion attached to the body 20 by a suitable mechanism such as fasteners and a second portion pivotally or foldable relative to the first portion. It should be appreciated that the folding mechanisms 44 allow the wings to be expanded or folded relative to the body 20.

Figure 9:
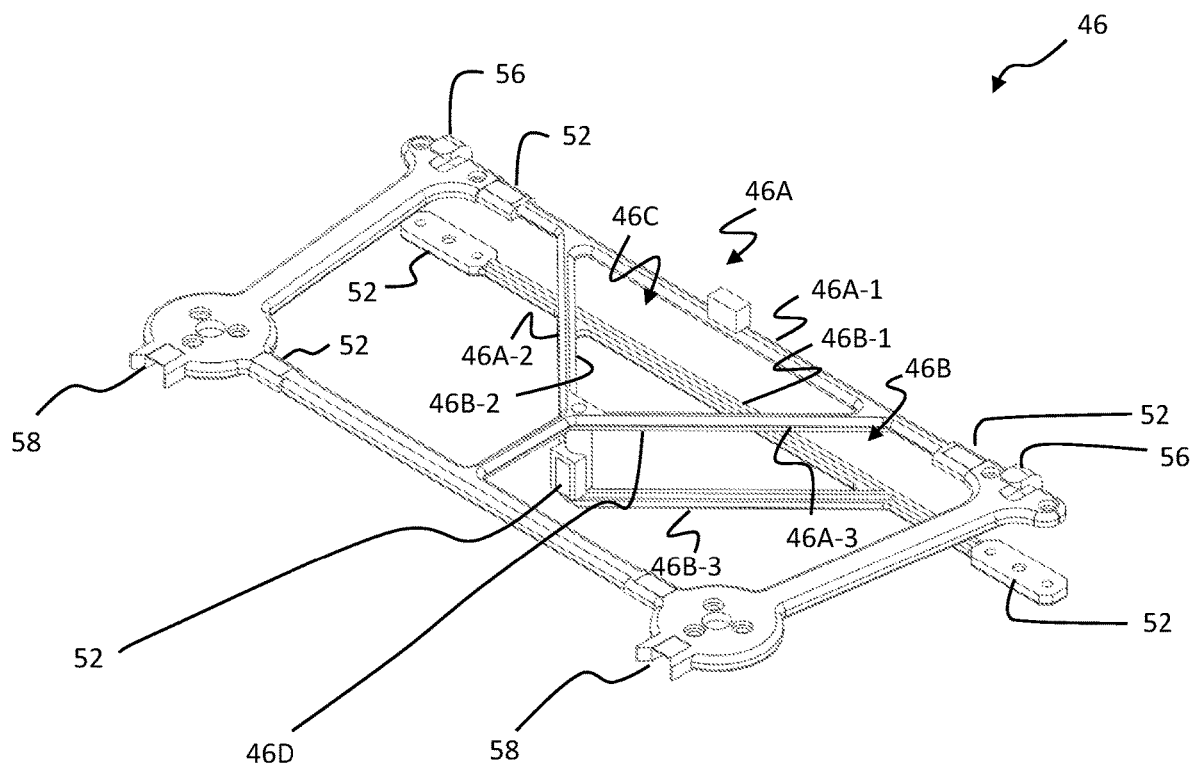
FIG. 9 is an exploded view of a wing support for the lift mechanism of FIG. 8.
Figure 10:
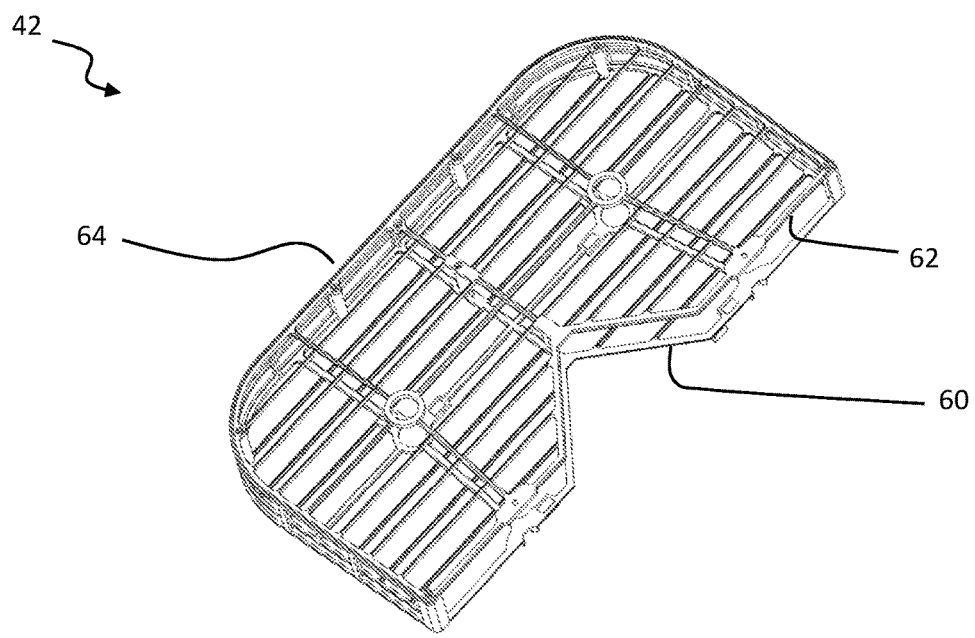
FIG. 10 is an exploded view of the detachable protection structure, according to the present invention, of FIGS. 5 and 6.

As illustrated in FIG. 8, each wing support 46 is rigidly connected to a pair of the folding mechanisms 44 by a suitable mechanism such as fasteners 54. The wing support 46 may be one or more components rigidly connected to each other by the fasteners 54. The propeller 48 and motor 49 are rigidly connected to the wing support 46 by the fasteners 54. In an embodiment, the one or more magnets 52 may be Hall effect sensors installed inside the body 20 to detect changes of an external magnetic field. The one or more magnets 52 are also embedded in the appropriate position on the wing support 46. For the lift mechanism 40, when the wings on both sides of the body 20 expand, the permanent magnet of the magnets 52 on the wing support 46 is approaching the Hall element of the magnets 52 inside the body 20. The Hall element of the magnets 52 can detect the signal of the magnetic field and identify the expansion state of the wings. When the wings on both sides of the body 20 are folded, the induction magnet of the magnets 52 on the wing support 46 is away from the Hall element of the magnets 52 inside the body 20. It should be appreciated that the Hall element of the magnets 52 cannot detect the signal of the magnetic field and identify the folding state. As illustrated in FIG. 9, several magnets 52 are embedded respectively in the wing supports 46. In an embodiment, the magnets 52 are generally rectangular in shape, but may be any suitable shape. The magnets 52 are spaced longitudinally and laterally relative to each other. The wing support 46 may also include a positioning hook 56 and a positioning guide groove 58 to be described.

The lift mechanism 40 of the aerial system 12 functions to provide lift by the propeller blades 48 driven (individually or collectively) by one or more motors 49 connected to the wing support 46. Each propeller blade 48 is preferably configured to rotate about a corresponding propeller axis, define a corresponding propeller plane normal to its propeller axis, and sweep out a swept area on its propeller plane. The motors 49 are preferably configured to provide sufficient power to the propeller blades 48 to enable flight of the aerial system 12, and are more preferably operable in two or more modes, at least one of which includes providing sufficient power for flight and at least one of which includes providing less power than required for flight (e.g., providing zero power, providing 10% of a minimum flight power, etc.). The power provided by the motors 49 preferably affects the angular velocities at which the propeller blades 48 rotate about their propeller axes. During flight of the aerial system 12, the set of propeller blades 48 are preferably configured to cooperatively or individually generate (e.g., by rotating about their propeller axes) substantially all (e.g., more than 99%, more than 95%, more than 90%, more than 75%) of the total aerodynamic force generated by the aerial system 12 (possibly excluding a drag force generated by the body 20 such as during flight at high airspeeds). Alternatively, or additionally, the aerial system 12 can include any other suitable flight components that function to generate forces for flight of the aerial system 12, such as jet engines, rocket engines, wings, solar sails, and/or any other suitable force-generating components.

In one variation, the aerial system 12 includes four propeller blades 48 and motors 49, each arranged at a corner of each wing support 46. The four propeller blades 48 and motors 49 are preferably substantially evenly dispersed about the aerial system 12, and each propeller plane is preferably substantially parallel (e.g., within 10 degrees) a lateral plane of the body 20 of the aerial system 12 (e.g., encompassing the longitudinal and lateral axes). The propeller blades 48 preferably occupy a relatively large portion of the entire aerial system 12 (e.g., 90%, 80%, 75%, or majority of the footprint of the aerial system 12, or any other suitable proportion of the aerial system 12). For example, the sum of the square of the diameter of each propeller blade 48 can be greater than a threshold amount (e.g., 10%, 50%, 75%, 90%, 110%, etc.) of the convex hull of the projection of the aerial system 12 onto a primary plane of the system (e.g., the lateral plane). However, the propeller blades 48 can be otherwise arranged.

As shown in FIG. 9, each wing support 46 includes an upper triangular structure 46A and a lower triangular structure 46B that form a triangular aperture 46C. The triangular aperture 46 facilitates handling of the aerial system 12 by the user. The triangular aperture 46 is formed by first, second and third members 46A-1, 46A-2, 46A-3, 46B-1, 46B-2, 46B-3 of the upper and lower triangular structures 46A, 46B.

The detachable protection structure 42 includes a first and second protection frame (e.g., cage) 60 and 62 extending along the propeller rotational plane and arranged along a first and second side of the body 20. In the illustrated embodiment of FIG. 10, the first and second protection frames 60, 62 are parallel the propeller rotational plane. In an embodiment, the first and second protection frames 60 and 62 are generally rectangular in shape, but may be any suitable shape. The first and second protection frames 60 and 62 can function as an intermediary component between the rotating propeller blades 48 and a retention mechanism (e.g., retention mechanism such as a user's hand). The first and second protection frames 60 and 62 can extend along a single side of the body 20 (e.g., along the bottom of the propellers 48, along the top of the propellers 48), along a first and second side of the body 20 (e.g., along the top and bottom of the propellers 48), encapsulate the propellers 48 (e.g., extend along all sides of the propellers 48), or be otherwise configured. The first and second protection frames 60 and 62 can be statically mounted or actuatably mounted to the body 20. The first and second protection frames 60 and 62 can be connected by a suitable mechanism such as fasteners 64 illustrated in FIG. 10, but magnets or adhesives can be applied to connect the first protection frame 60 and the second protection frame 62 together.

The first and second protection frames 60 and 62 each can include one or more apertures (e.g., airflow apertures) fluidly connecting one or more of the propeller blades 48 to an ambient environment, which can function to enable the flow of air and/or other suitable fluids between the ambient environment and the propeller blades 48 (e.g., enabling the propeller blades 48 to generate an aerodynamic force that causes the aerial system 12 to move throughout the ambient environment). The apertures can be elongated, or can have comparable length and width. The apertures can be substantially identical, or can differ from each other. The apertures are preferably small enough to prevent components of a retention mechanism (e.g., fingers of a hand) from passing through the apertures. The geometrical transparency (e.g., ratio of open area to total area) of the protection frame 60, 62 near the propeller blades 48 is preferably large enough to enable flight of the aerial system 12, more preferably enabling high-performance flight maneuvering. For example, each aperture can be smaller than a threshold size (e.g., smaller than the threshold size in all dimensions, elongated slots narrower than but significantly longer than the threshold size, etc). In a specific example, each of the first and second protection frames 60 and 62 has a geometrical transparency of 80-90%, and the apertures (e.g., circles, polygons such as regular hexagons, etc.) each of which define a circumscribed circle with a diameter of 12-16 mm. However, the apertures can be otherwise configured. It should be appreciated that the each of the first and second protection frames 60 and 62 may have other ranges for the geometrical transparency, and the apertures may have other diameters than specifically described.

Figure 11:
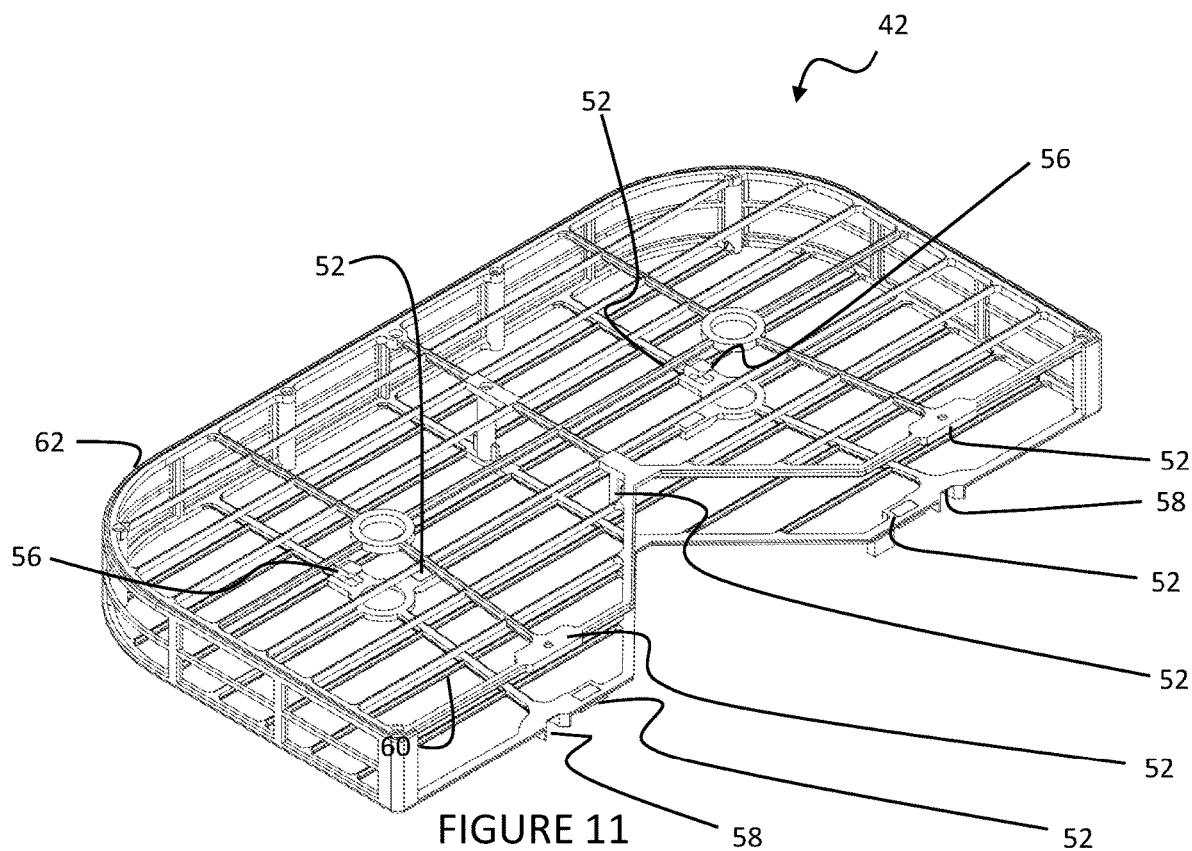
FIG. 11 is another perspective view of the detachable protection structure of FIG. 10.

As illustrated in FIG. 11, several magnets 52 are embedded respectively in the first and second protection frames 60 and 62. The first and second protection frames 60 and 62 may include the positioning hook 56 and the positioning guiding groove 58. For example, the positioning hook 56 of the first protection frame 60, the magnet 52 of the first protection frame 60, the positioning guiding groove 58 of the second protection frame 62, and the magnet 52 of the second protection frame 62 are illustrated.

Figure 12:
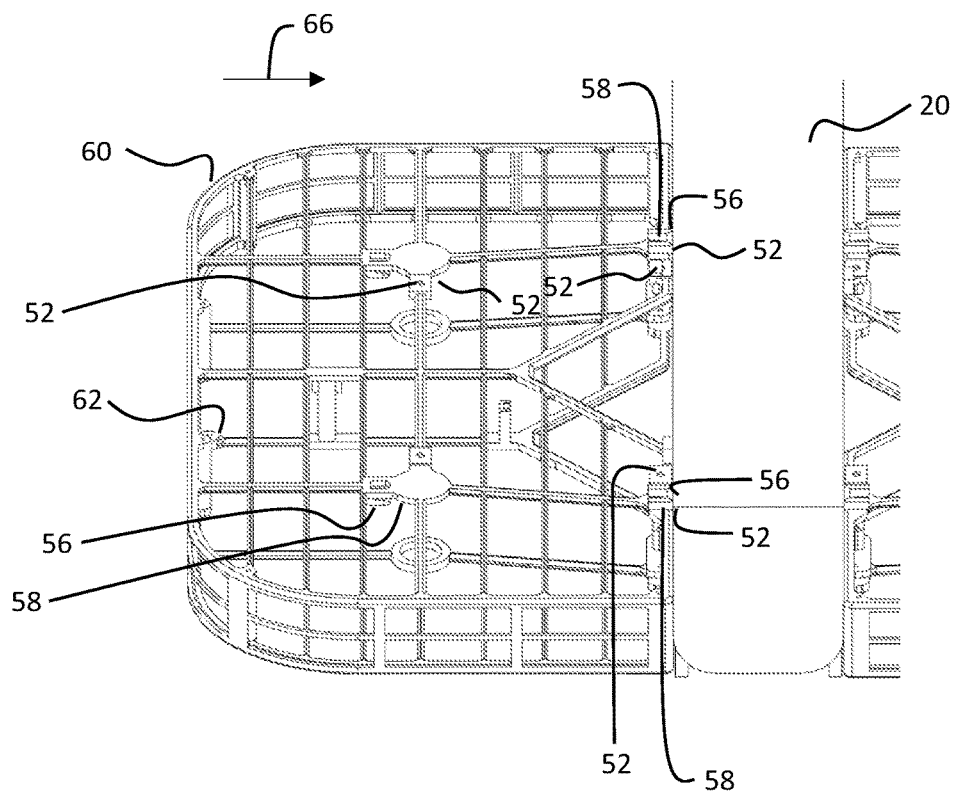
FIG. 12 is a perspective view of the detachable protection structure and aerial system of FIGS. 9-11 illustrated being assembled.
Figure 13:
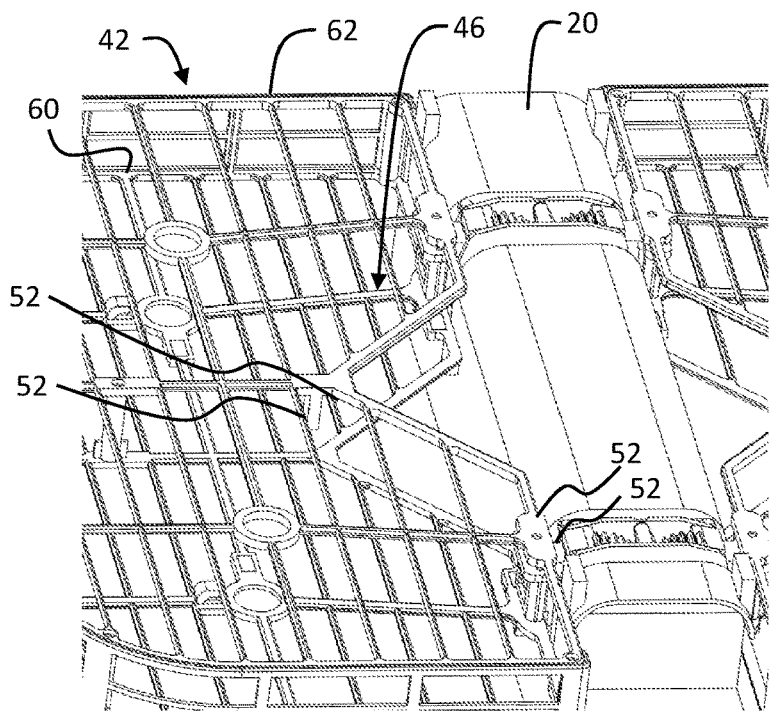
FIG. 13 is a perspective view of the detachable protection structure and aerial system of FIGS. 9-11 illustrated assembled.

The detachable protection structure 42 can be assembled as illustrated in FIGS. 12 and 13. The detachable protection structure 42 can be inserted in the direction of the arrow 66 shown in FIG. 12 relative to the body 20 in which the propeller blades 48 and the motor 49 are not illustrated. The detachable protection structure 42 and the wing support 46 can be fixed relative to each other with the positioning hook 56 and the positioning groove 58 or the magnets 52 or the combination of the two. The positioning hook 56 of the first protection frame 60 fits within the positioning guiding groove 58 of the wing support 46. The positioning hook 56 of the wing support 46 fits within the positioning guiding groove 58 of the first protection frame 60. The first protection frame 60 can be accurately positioned by the magnetic attractive force between the magnets 52 in first protection frame 60 and the magnets 52 in the wing support 46. The second protection frame 62 can be accurately positioned by the magnetic attractive force between the magnets 52 in the second protection frame 62 and the magnets 52 in the wing support 46.

Figure 14:
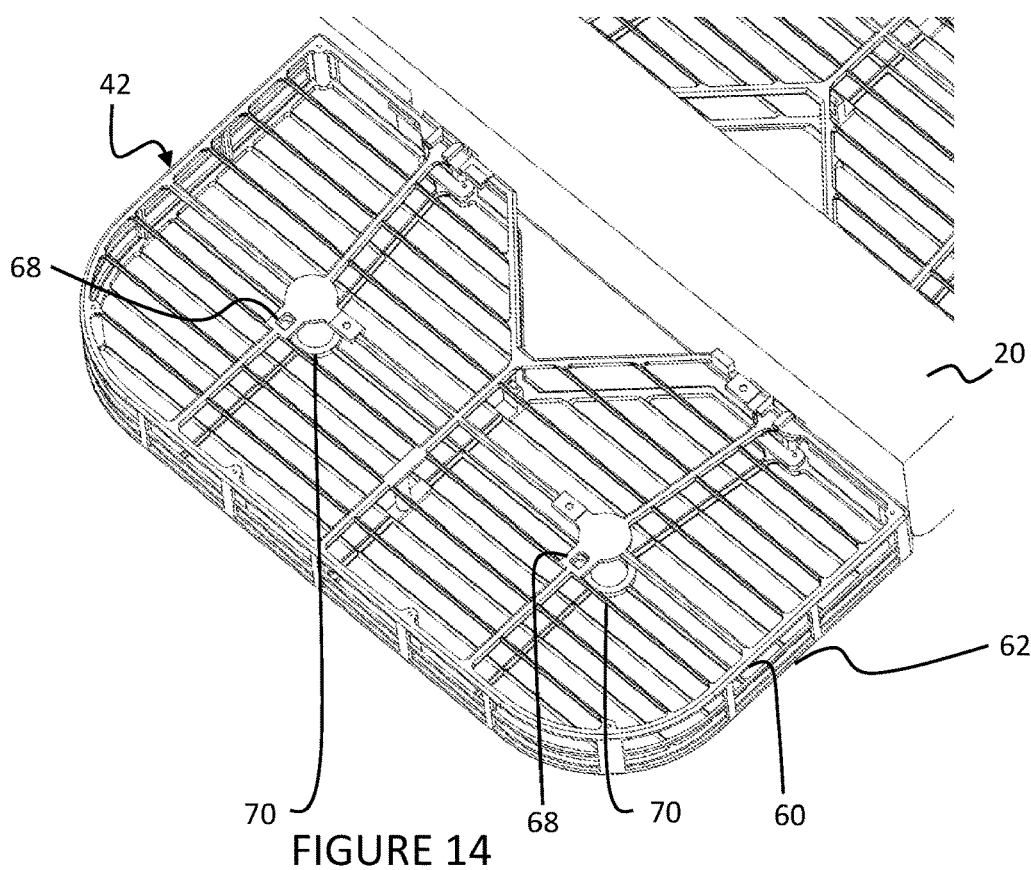
FIG. 14 is a perspective view of the detachable protection structure and aerial system of FIGS. 9-11.
Figure 15:
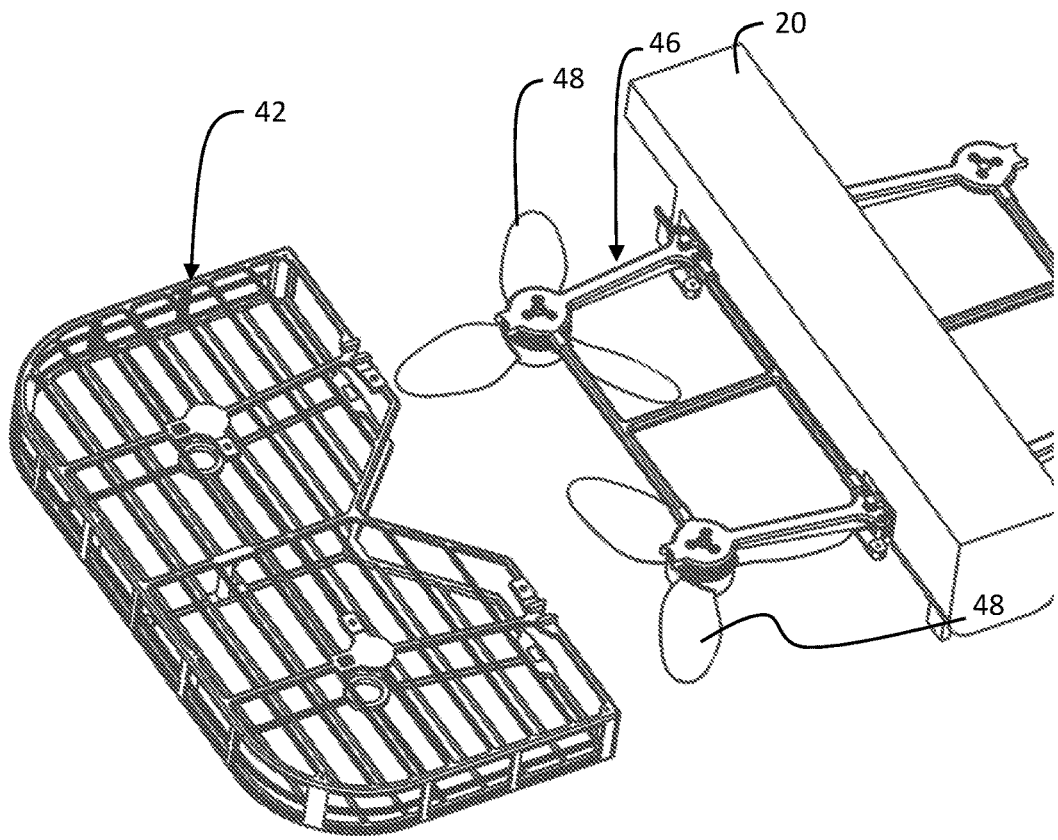
FIG. 15 is an exploded view of another embodiment of the detachable protection structure and aerial system of FIGS. 5-11.

Referring to FIG. 14, the wing support 46 may include at least one, preferably two color warning areas 68 on both sides, and the detachable protection structure 42 may include a corresponding opening 70. In one embodiment, the color warning areas 68 and opening 70 are generally circular in shape, but may be any suitable shape. If the first protection frame 60 is assembled in place, the user or operator can see the color indication of the color warning area 68 through the opening 70 in the second protection frame 62. Otherwise, this means the first protection frame 60 is not installed properly.

Figure 16:
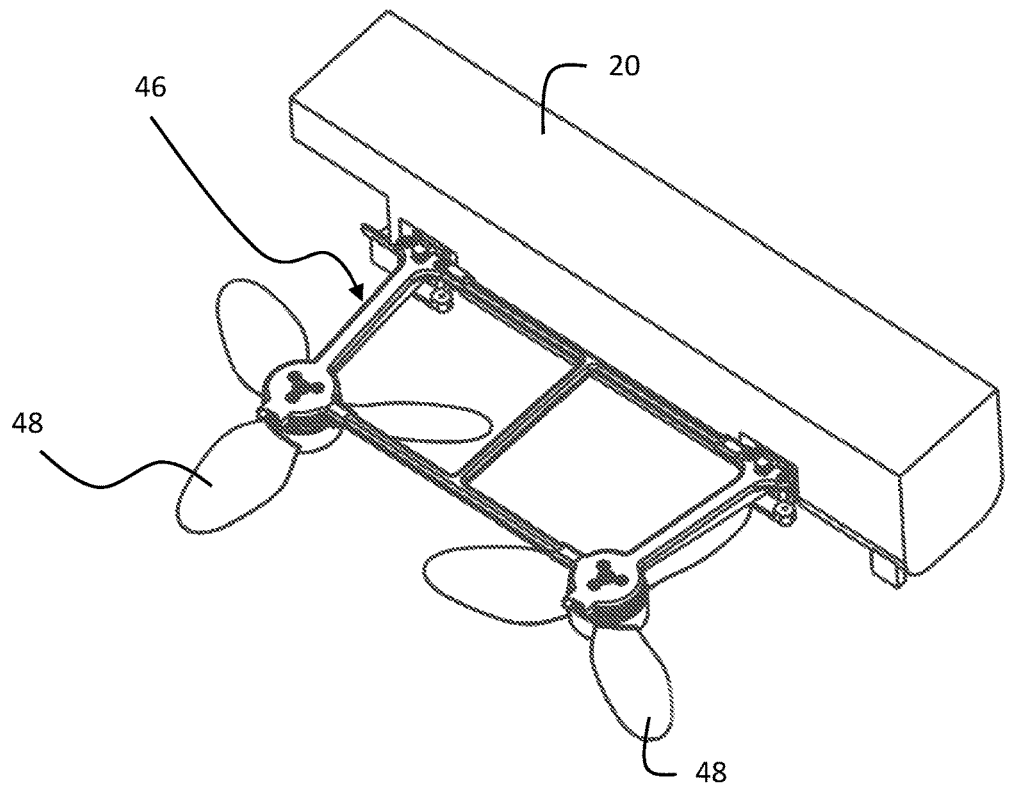
FIG. 16 is a perspective view of the aerial system of FIG. 15 without the detachable protection structure.
Figure 17:
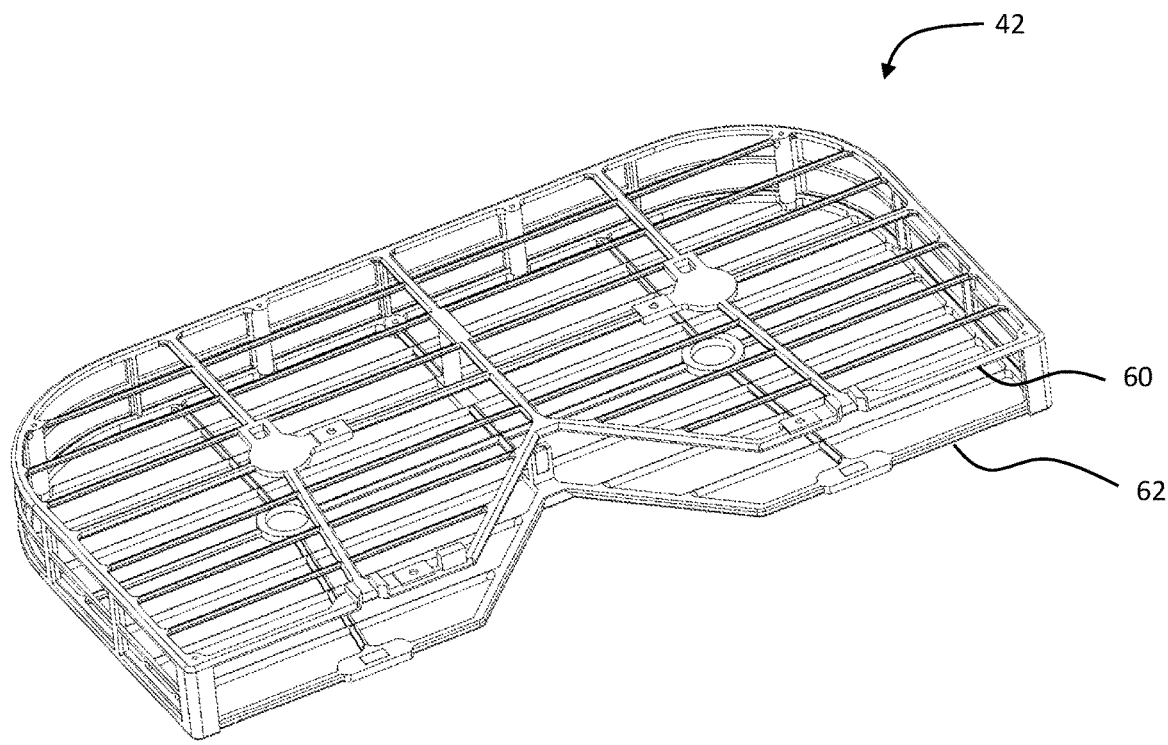
FIG. 17 is a perspective view of the detachable protection structure of FIG. 15.
Figure 18:
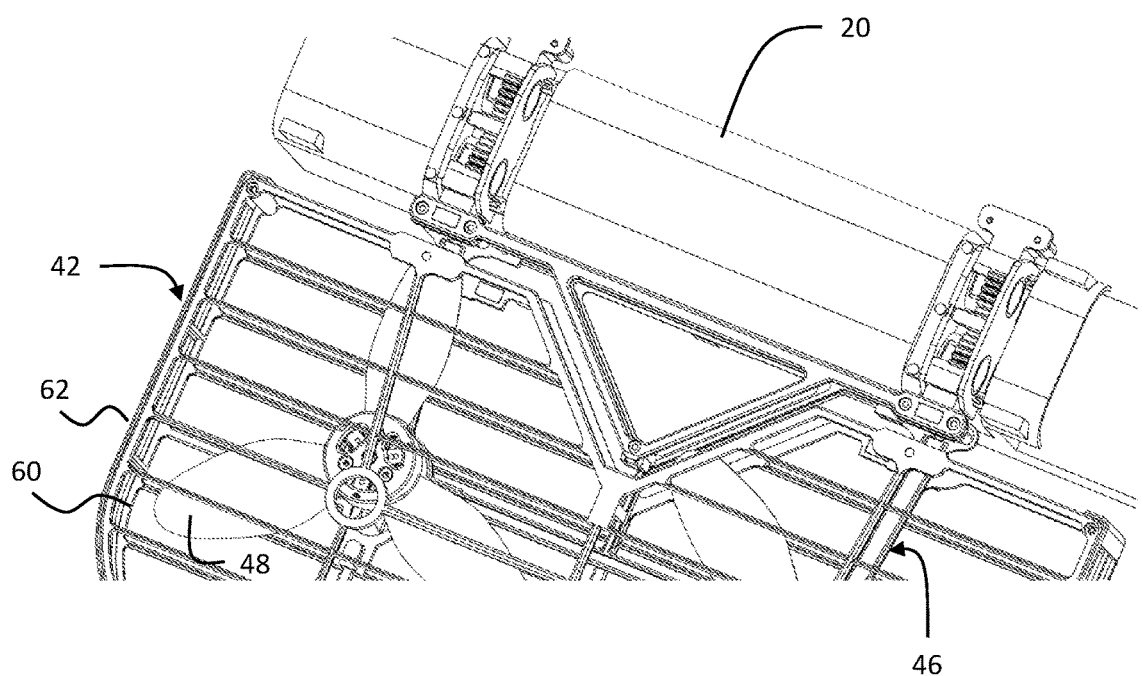
FIG. 18 is a perspective view of the detachable protection structure assembled to the aerial system of FIG. 15.

In another embodiment illustrated in FIGS. 15-18, the lift system 40 of the aerial system 12 reduces cost and assembly steps by reducing parts. Compared to the embodiment of FIGS. 5-14, the wing support 46 can be removed from the basic framework as illustrated in FIG. 16. The vertical magnet 52 of the second protection frame 62 can be removed as shown in FIG. 17. One or multiple magnets 52 are put on a hinge shaft as shown in FIG. 18, It should be appreciated that the assembly and disassembly method of the first protection frame 60, second protection frame 62, and wing support 46 are similar to the embodiment of FIGS. 5-14.

Figure 19:
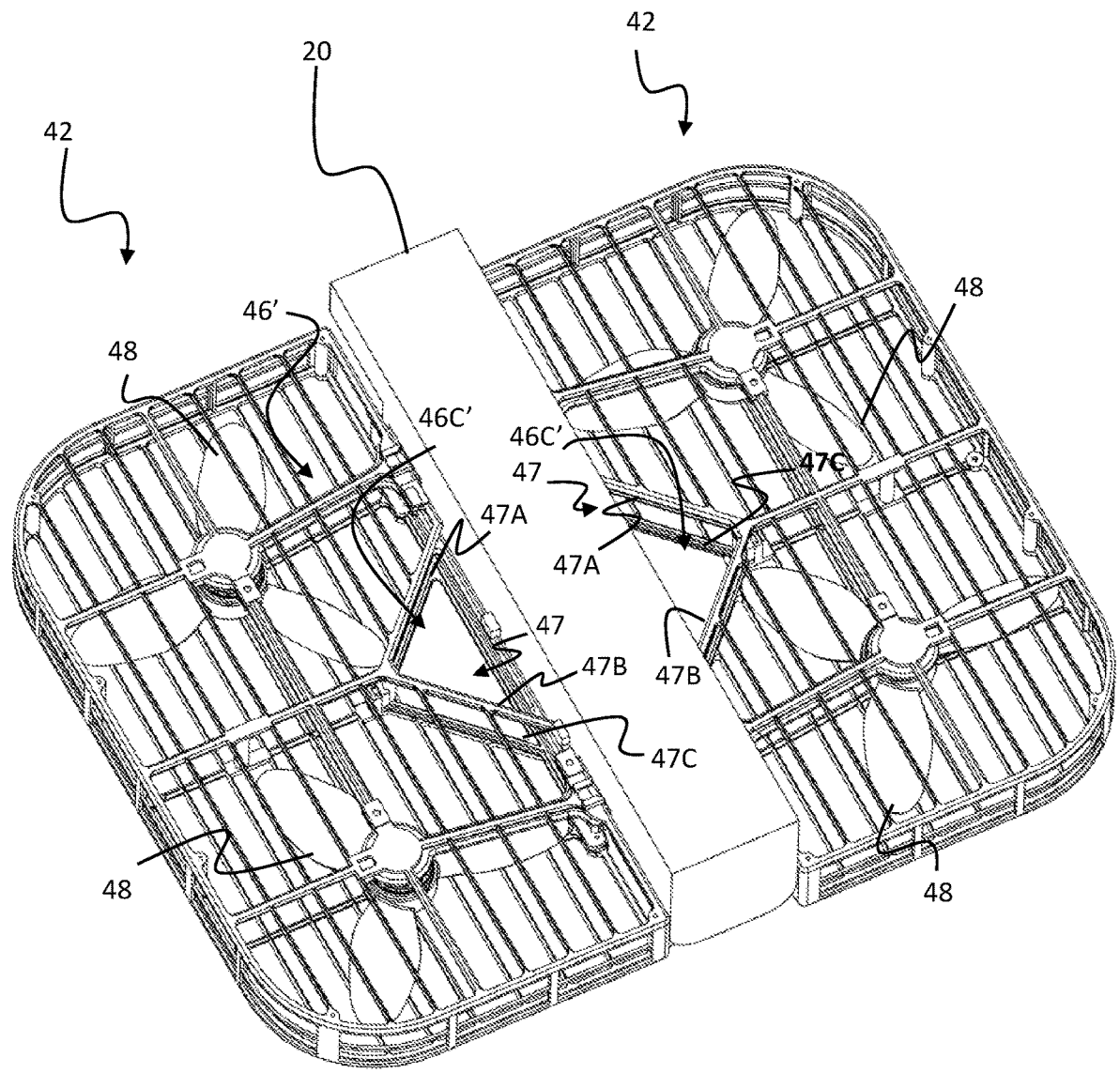
FIG. 19 is a schematic representation of the aerial system having a wing support and detachable protection structure according to an alternative embodiment of the present invention.

With reference to FIG. 19, an alternative embodiment of the wing supports 46' are shown. In the alternative embodiment each wing support 46' has a revised shape which facilitates easier handling of the aerial system 12 by the user. As shown in FIG. 19, each wing support 46' includes a (single) handling structure 47. The handling structure 47 is formed by a first member 47A and a second member 47B. A guard portion 47C, which extends away from (downward in FIG. 19) the wing supports 46', is provided to protect the user from the propellers 48. The first member 47A, second member 47B and a side of the body 20 form a triangular aperture 46C'. The triangular aperture 46C' allows easier handling of the aerial system 12 compared to the triangular aperture 46 of the embodiment shown in FIG. 9.

Figure 20:
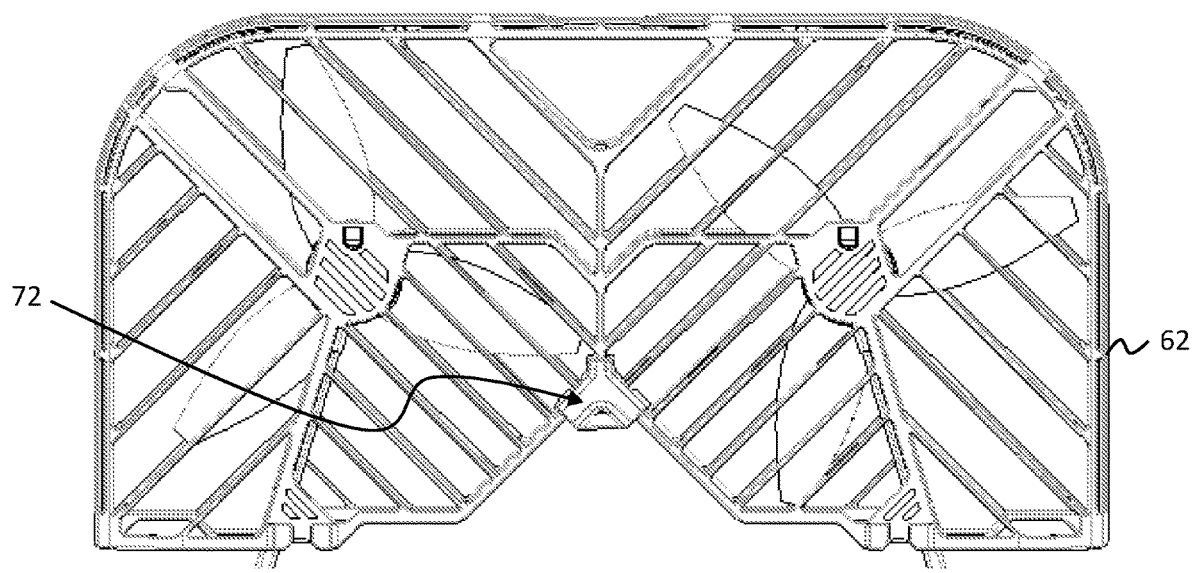
FIG. 20 is a plan view of a clip and upper or second protection frame of the detachable protection structure of the aerial system according to an embodiment of the present invention.

Referring to FIG. 20, an assembly of the upper or second protection frame 62 of the detachable protection structure 42 and a clip 72 is shown according to an embodiment of the present invention. It should be appreciated that the clip 72 enhances the strength of the connection between the second protection frame 62 of the detachable protection structure 42 and a base frame 46D (FIG. 9) of the wing support 46.

Figure 21:
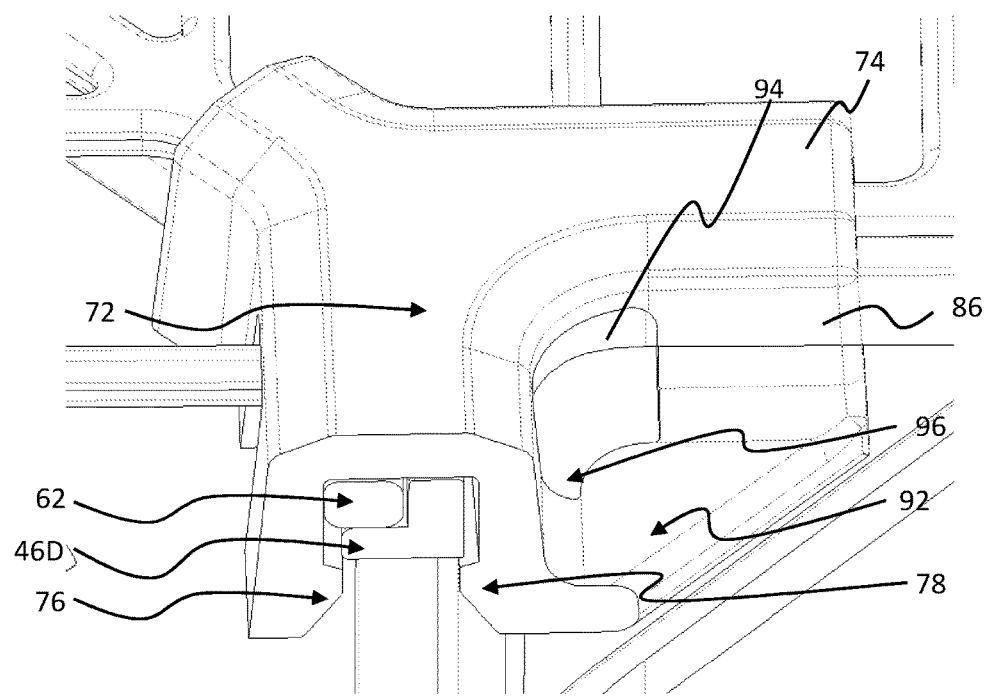
FIG. 21 is a perspective view of the upper protection frame and clip of FIG. 20.
Figure 22:
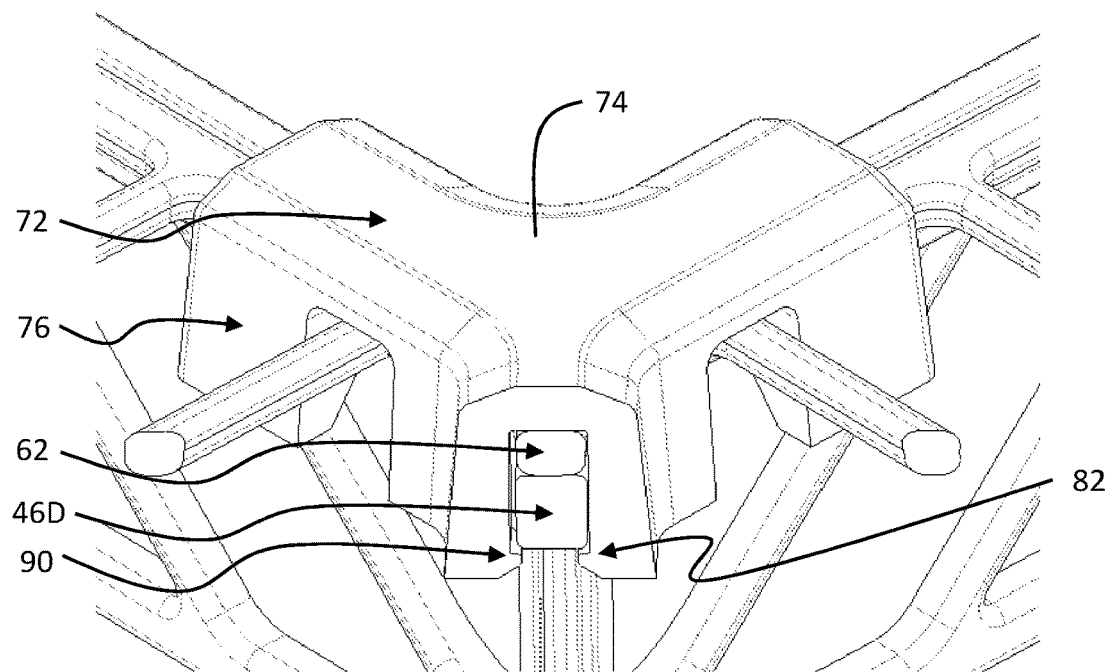
FIG. 22 is another perspective view of the upper protection frame and clip of FIG. 20.
Figure 23:
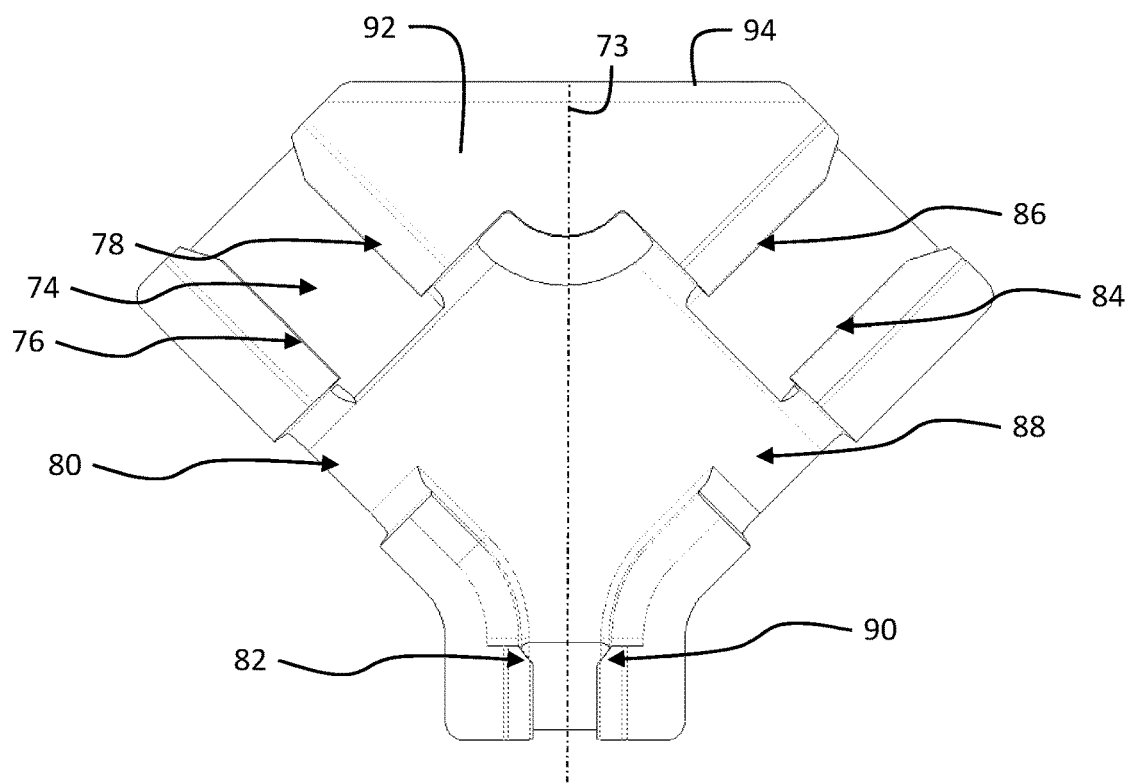
FIG. 23 is a plan view of the clip of FIG. 20.

Referring to FIGS. 21-23, the clip 72 is symmetrically designed along a symmetry axis 73 to match the base frame 46D of the wing support 46. In one embodiment, the clip 72 has a general "Y" shape, but may be any suitable shape such as a "V", quadrangle, pentagon, etc. The clip 72 includes a first upper wall or base 74 having a generally planar and "Y" shape. It should be appreciated that the clip 72 may be a single component, or can be attached together with the wing support 46, 46' under any mechanical form such as hinges, springs, magnets, etc.

In one embodiment, the clip 72 includes a first clip outer wall or side 76 extending outwardly and generally perpendicularly from the first upper base 74 and a first clip inner wall or side 78 spaced from the first clip outer side 76 and extending outwardly and generally perpendicularly from the first upper base 74. The clip 72 also includes a first notch 80 extending through the first clip outer side 76. The first notch 80 has a generally inverted "U" shape, but may have any suitable shape. The clip 72 further includes a first clip wall or end 82 extending from the first clip outer side 76 and outwardly and generally perpendicularly from the first upper base 74. The clip 72 includes a second clip outer wall or side 84 extending outwardly and generally perpendicularly from the first upper base 74 and a second clip inner wall or side 86 spaced from the second clip outer side 84 and extending outwardly and generally perpendicularly from the first upper base 74. The clip 72 includes a second notch 88 extending through the second clip outer side 84. The second notch 88 has a generally inverted "U" shape, but may have any suitable shape. The clip 72 also includes a second clip wall or end 90 extending from the second clip outer side 84 and outwardly and generally perpendicularly from the first upper base 74. The clip 72 includes a second or lower wall or base 92 spaced from the first upper base 74. The second lower base 92 is planar and generally parallel to the first upper base 74. The second lower base 92 extends outwardly and generally perpendicular to the first clip inner side 78 and the second clip inner side 86. The clip 72 also includes an end wall or side 94 extending outwardly and generally perpendicularly from the first upper base 74 and the second lower base 92. The clip 72 further includes a through hole 96 extending through the end side 94. The clip 72 is made of a material such as plastic or metal and is integral, unitary, and one-piece. It should be appreciated that the second lower base 92 forms a hand hold/pick place for the clip 72. It should also be appreciated that the first clip outer side 76, first clip inner side 78, and first clip end 82 are mirrored with the second clip outer side 84, second clip inner side 86, and second clip end 90 along the symmetry axis 73. It should further be appreciated that the first notch 80 is mirrored with the second notch 88 along the symmetry axis 73.

Figure 24:
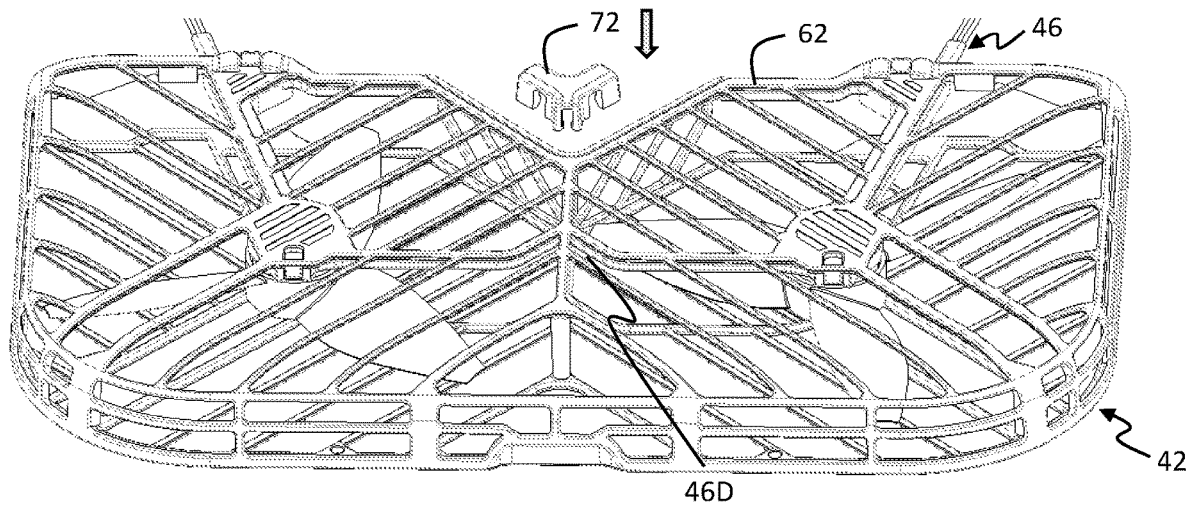
FIG. 24 is a perspective view of the upper protection frame and clip of FIG. 20 illustrated being assembled.

Referring to FIG. 24, the detachable protection structure 42 is shown with the upper or second protection frame 62 and the clip 72 prior to assembly or illustrated being assembled. When installing the clip 72 to the second protection frame 62, the clip 72 is aligned with a Y-shaped area of the detachable protection structure 42 and pressed down until the sound of "clicking" is heard by the user, which confirms the installation of the clip 72 is in place to the second protection frame 62 and the base frame 46D.

Figure 25:
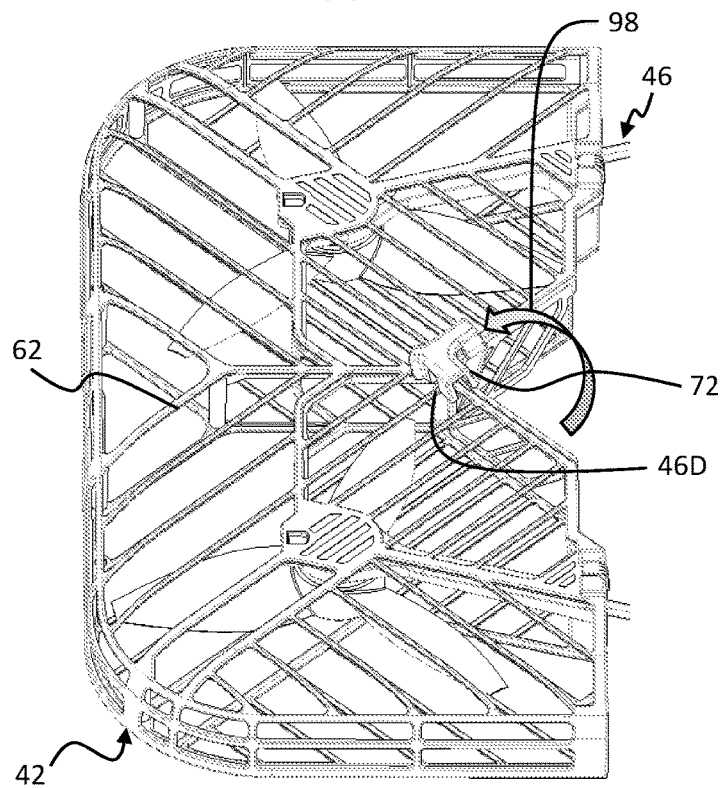
FIG. 25 is a perspective view of the upper protection frame and clip of FIG. 20 illustrated assembled.
Figure 26:
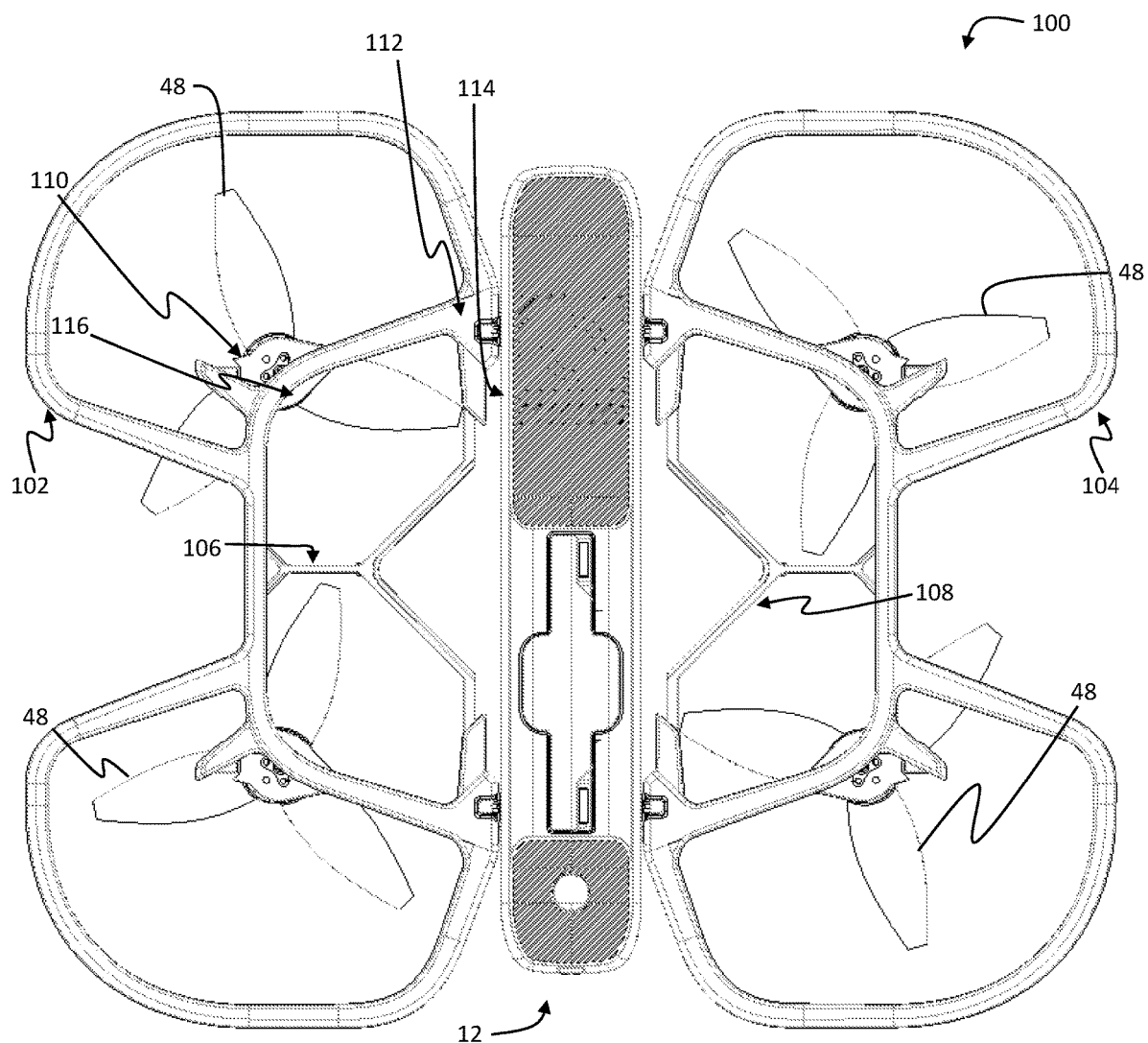
FIG. 26 is a plan view of the aerial system having a semi-protective frame according to an alternative embodiment of the present invention.
Figure 27A:
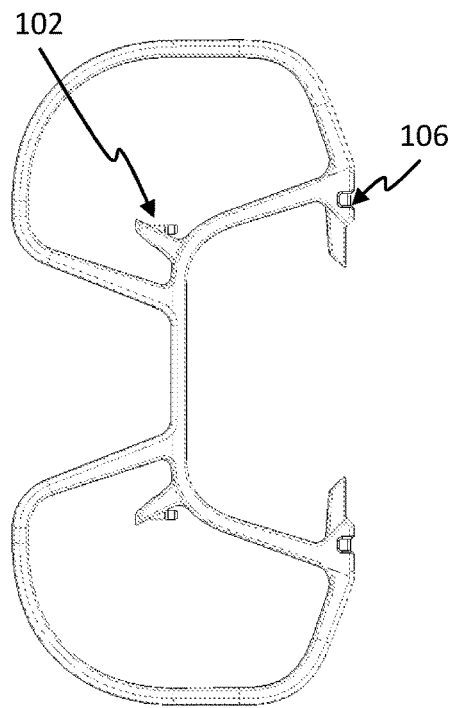
FIG. 27A and FIG. 27B are a top view and bottom view, respectively, of the semi-protective frame of FIG. 26.
Figure 27B:
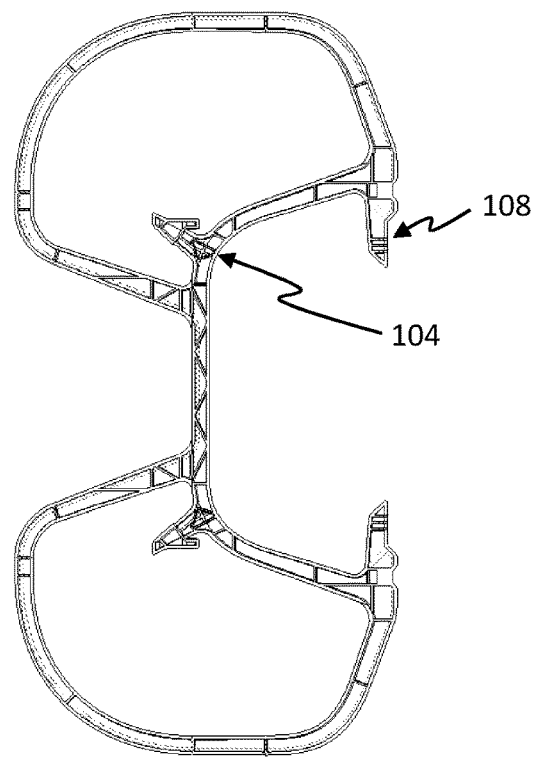

Referring to FIG. 25, the detachable protection structure 42 is shown with the upper or second protection frame 62 and the clip 72 after assembly or illustrated assembled. When disassembling the clip 72 from the detachable protection structure 42, the user uses his/her fingers to cover the position of the through hole 96 and flip the clip 72 up slightly as indicated by the arrow 98 to detach the clip 72 from the detachable protection structure 42.

The present invention of the clip 72 for the detectable protection structure 42 has a simple structure and is convenient to install and detach protection frames 62. The present invention of detectable protection structure 42 uses three pairs of clips 72 to snap the upper or second protective frame 62 to the base frame 46D of the wing support 46. The clip 72 enhances the durability and reliability, ensures that the protection frames 62 will not come loose during flight, collision, and accidental crashes. It should be appreciated that two of the notches 80 and 88 step aside beams of the second protection frame 62. It should be appreciated that adding the through holes 96 enlarges the deformation of the protection frames 62, which provide wider space for hand to hold/place, making it easier to disassemble.

Advantageously, the detectable protection structure 42 may be quickly dismantled and installed on the aerial system 12. The aerial system 12 can recognize whether the detection protection structure 42 is installed. The aerial system 12 can automatically recognize the expansion state and folding state of the wings of the lift mechanism 40.

Accordingly, the detachable protection structure 42 for the aerial system 12 is designed to be quickly dismantled and installed according to different requirements using magnetic elements, guiding slots, and limit buckles. The magnets 52 are installed in the detachable protection structure 42. The on-board system detects signal of the external magnetic field through the built-in Hall element of the magnets 52 to judge whether the detachable protection structure 42 is installed. The wings on both sides of the body 20 are designed to be foldable with a double-shaft structure of the wing support 46 and a magnet structure, which reduces the device size when not in use and facilitates quick storage.

Semi-Protective Frame

With reference to FIGS. 26-39, and specifically, to FIGS. 26-33, the present invention provides an embodiment of a semi-protective frame, generally indicated at 100, for the aerial system 12. The semi-protective frame 100 provides another form of protection for the aerial system 12 and is located above the rotor or propeller blades 48, ensuring that the vertical projection of the propeller blades 48 is covered by the semi-protective frame 100 in order to avoid injury. It should be appreciated that the semi-protective frame 100 is an alternative embodiment to the detachable protection structure 42.

In one embodiment, the semi-protective frame 100 includes a first or left semi-protective frame member 102 and a second or right semi-protective frame member 104. The semi-protective frame 100 is symmetrical, and the left and right protective frame members 102 and 104 are interchangeable. The semi-protective frame members 102, 104 extend along the body 20 of the aerial system 12 and cover the propeller blades 48. The aerial system 12 also includes a first or left bracket 106 and a second or right bracket 108 on the wing support 46. The semi-protective frame 100 also includes structural features such as a hook 110, a groove 112, a clip 114, and a magnet groove 116 on the semi-protective frame members 102, 104 and the wing support 46. The brackets 106 and 108 of the aerial system 12 are matched by the hook 110 and the groove 112, ensuring that the semi-protective frame 100 can be reliably connected to the aerial system 12 and is easy to disassemble. It should be appreciated that, at the same time, the semi-protective frame 100 and the brackets 106 and 108 of the aerial system 12 are also joined by the clips 114 and the magnets 52, which provide additional protection to ensure that the semi-protective frame 100 does not come loose from the aerial system 12. It should also be appreciated that the clips 114 may be similar to the clips 72. It should further be appreciated that, because each of the semi-protective frame members 102 and 104 are symmetrical, its mirror surface having a corresponding mirror image feature.

Figure 28:
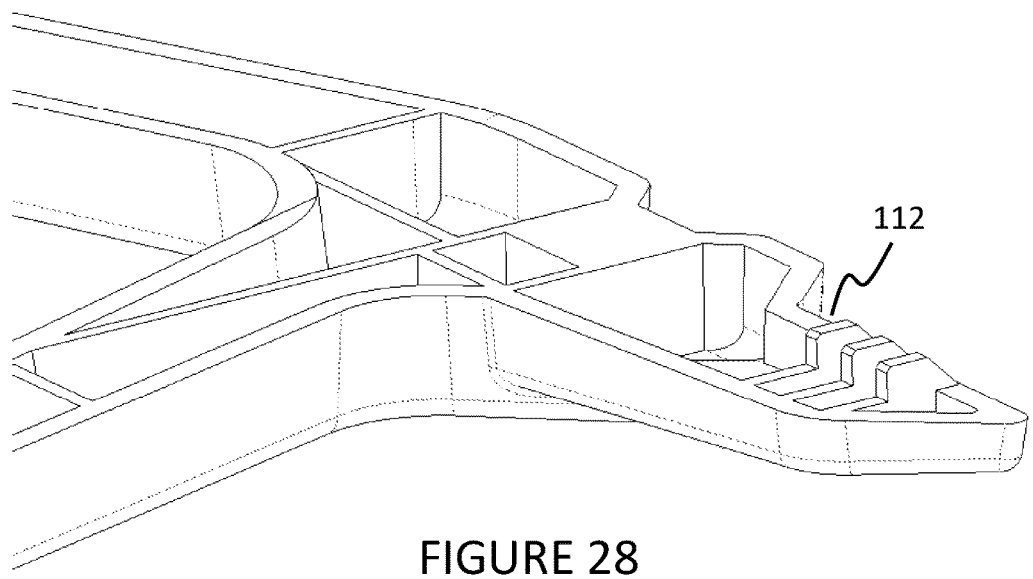
FIG. 28 is a perspective view of a clip of the semi-protective frame of FIG. 26.
Figure 29:
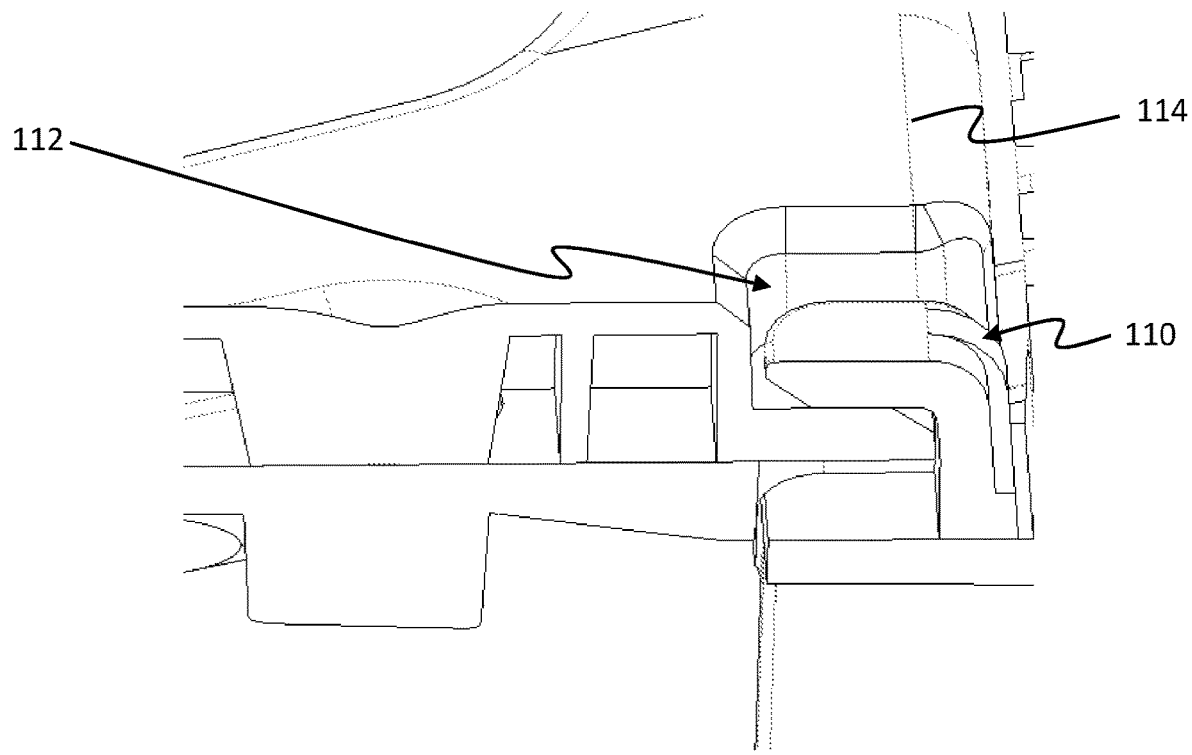
FIG. 29 is a perspective view of a groove and hook of the semi-protective frame of FIG. 26.
Figure 30:
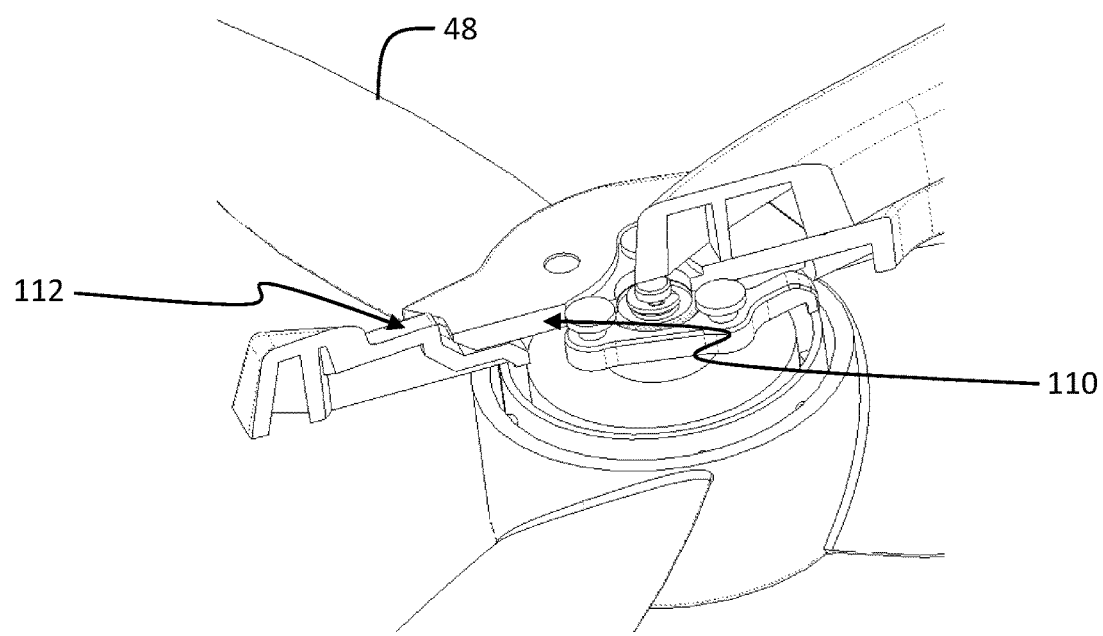
FIG. 30 is a perspective view of the hook and groove of the semi-protective frame of FIG. 26.
Figure 31:
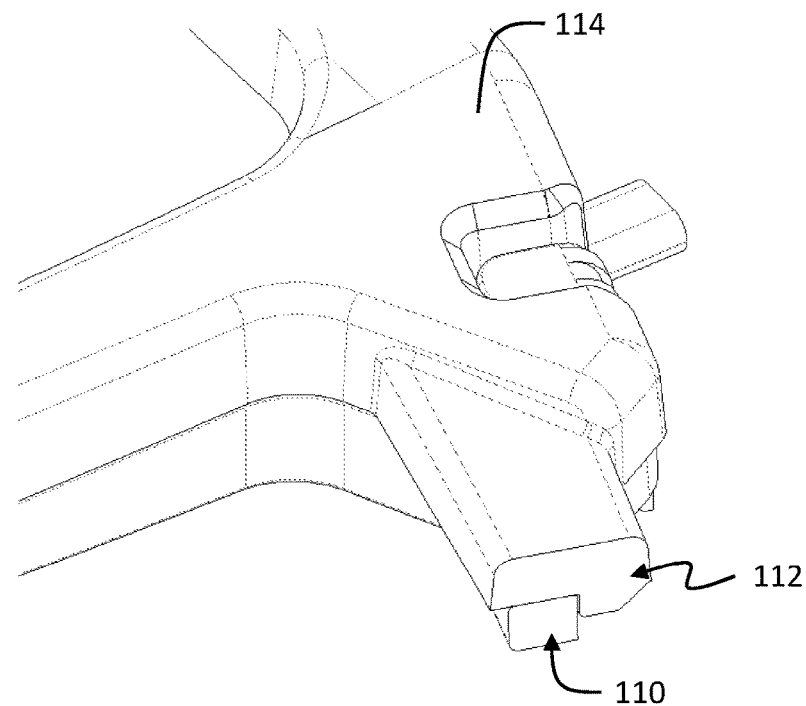
FIG. 31 is a perspective view of a clip and base bracket beam of the semi-protective frame of FIG. 26.
Figure 32:
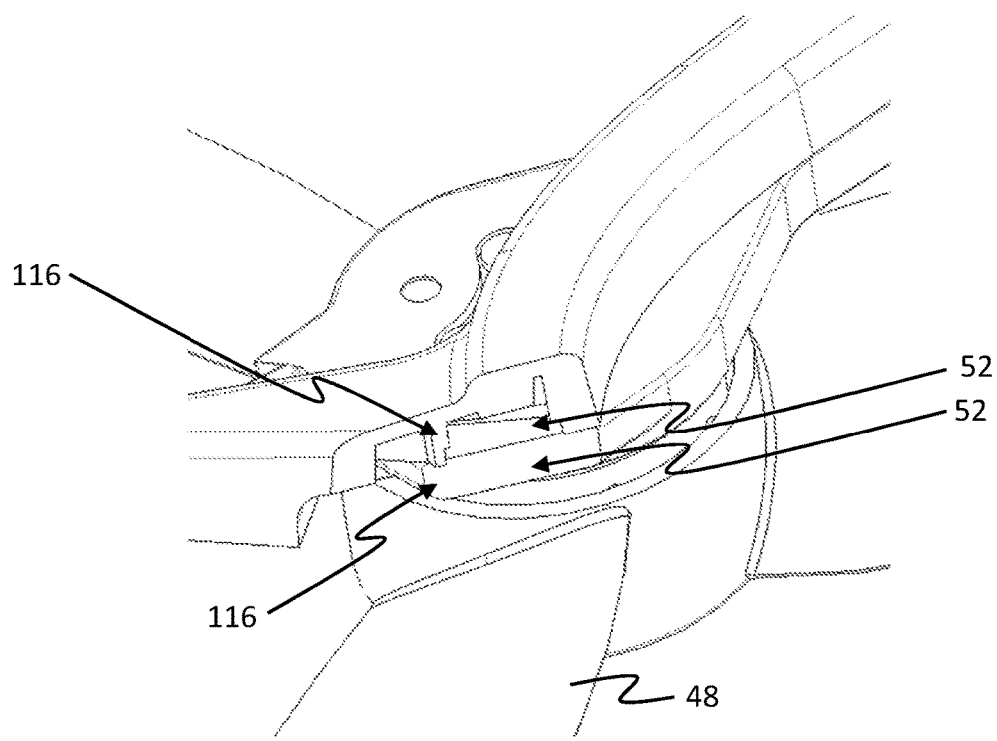
FIG. 32 is a perspective view of a magnet and groove of the semi-protective frame of FIG. 20 illustrated assembled.

Referring to FIG. 28, the clip 114 is illustrated with the groove 112. Referring to FIG. 29, the hook 110 and groove 112 are illustrated. The hook 110 has a general inverted "L" shape, but may be any suitable shape for fitting in the groove 112. The groove 112 is generally recessed into the clip 114. The groove 112 on the semi-protective frame member 102, 104 is paired with the hook 110 on the bracket 106, 108 of the aerial system 12 and the hook 110 on the semi-protective frame member 102, 104 is paired with the groove 112 on the bracket 106, 108 of the aerial system 12. It should be appreciated that these two paired structures help to ensure accurate positioning of the semi-protective frame members 102, 104. It should also be appreciated that the clip 114 is engaged with the magnet groove 116 of the base bracket beam of the wing support 46, and the magnets 52 provides a restriction to ensure that the semi-protective frame 100 does not come loose.

To install the semi-protective frame 100, since the hook 110 and the groove 112 provide the guiding, the semi-protective frame members 102, 104 only need to be inserted vertically in the direction of the aerial system 12. When the user hears a click sound, the clip 114 is installed in place, which means, the semi-protective frame 100 is installed.

Figure 33:
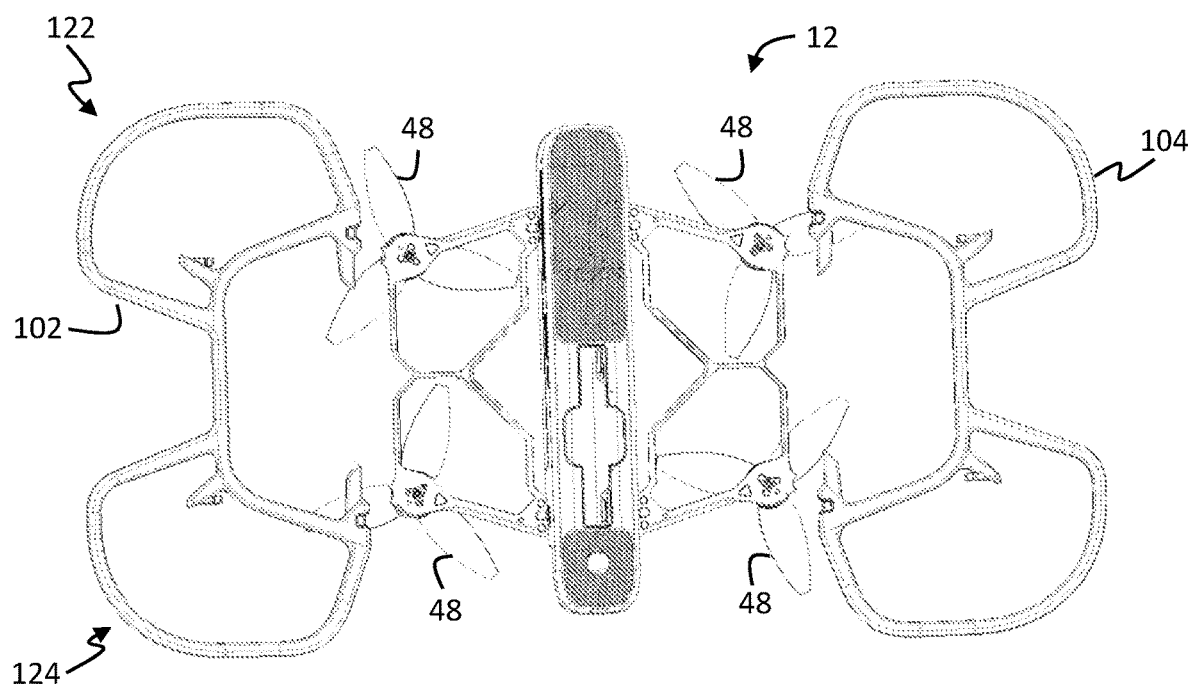
FIG. 33 is a plan view of the semi-protective frame of FIG. 26 illustrated being assembled to the aerial system.

To disassemble the semi-protective frame 100, directly pull out the semi-protective frame members 102, 104 by the hand of the user. It should be appreciated that locations 122 and 124 on the semi-protective frame members 102, 104 is the suggested place to put hands of the user on when disassembling the semi-protective frame members 102, 104 as illustrated in FIG. 33.

Folding Mechanism

Figure 34:
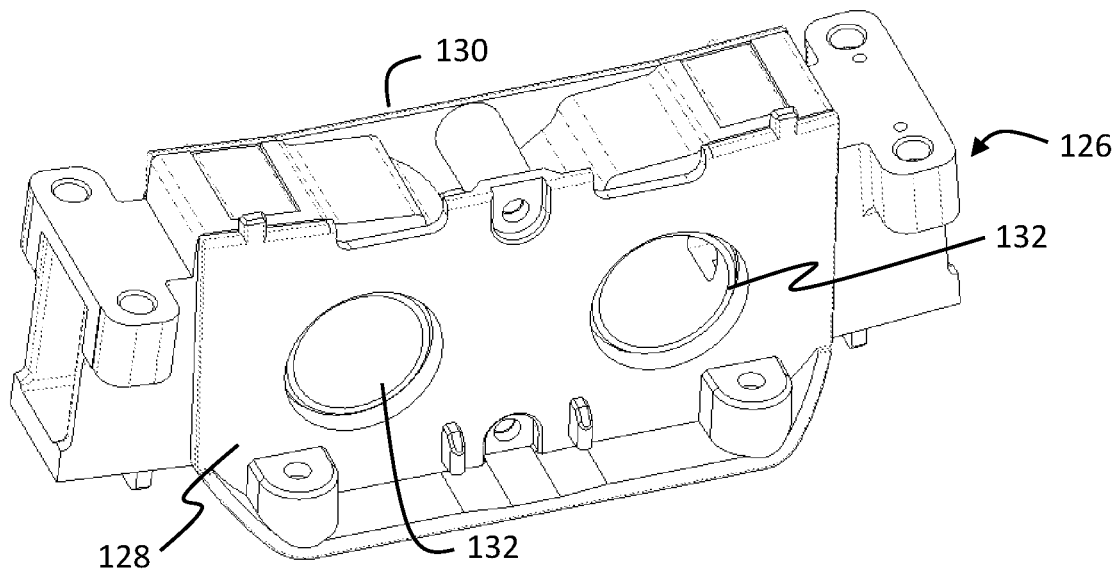
FIG. 34 is a perspective view of a folding mechanism illustrated in an un-folded state according to an alternative embodiment of the present invention.
Figure 35:
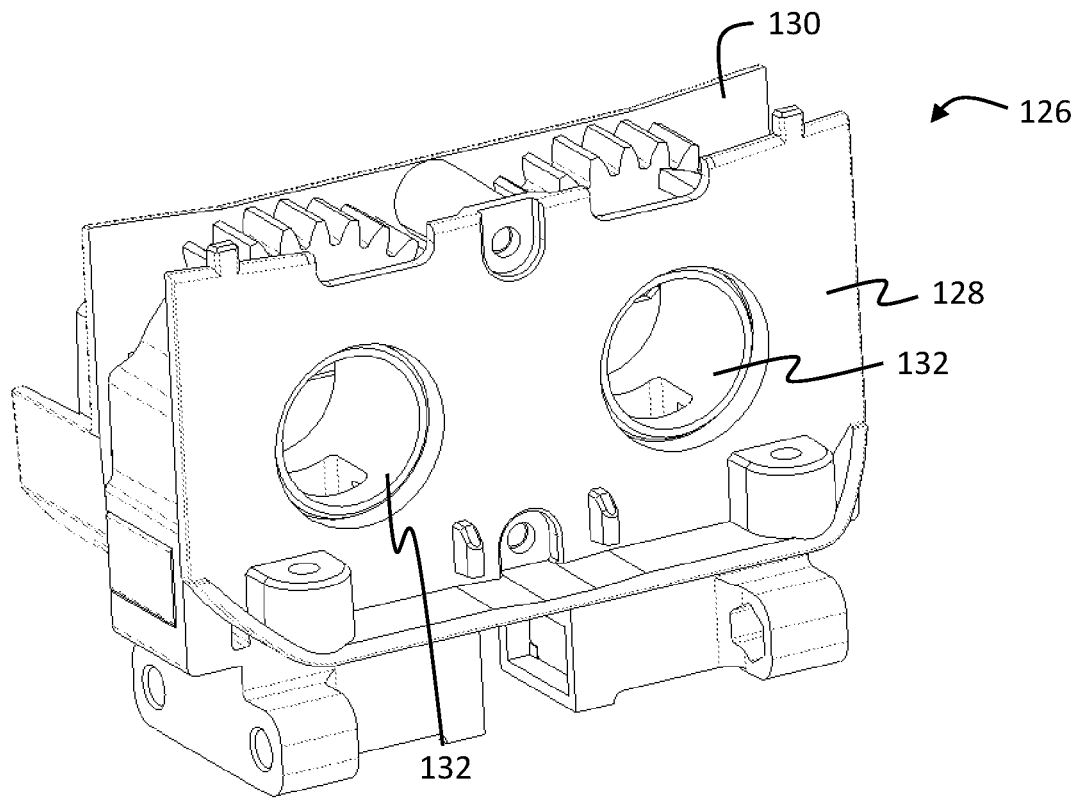
FIG. 35 is a perspective view of the folding mechanism of FIG. 34 illustrated in a folded state.
Figure 36:
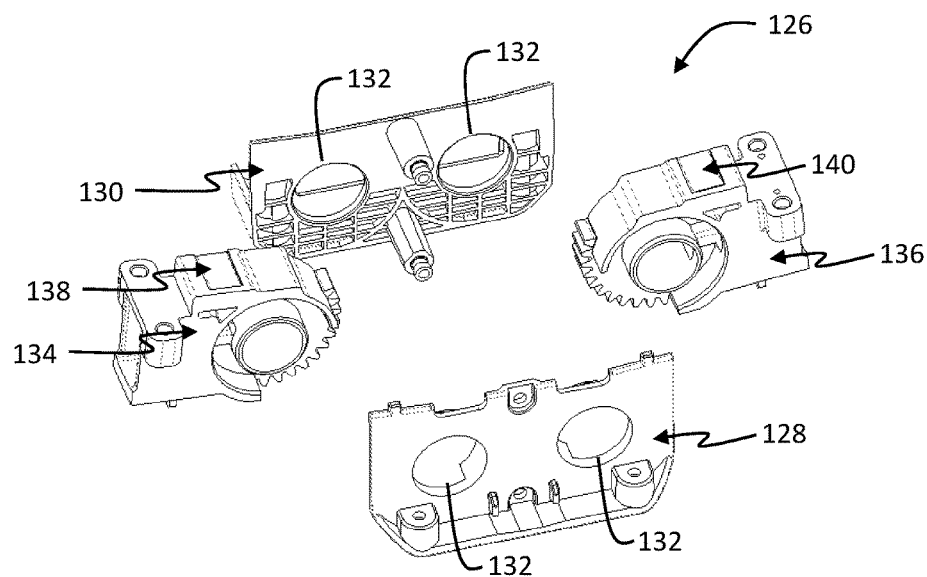
FIG. 36 is an exploded view of the folding mechanism of FIG. 34.
Figure 37:
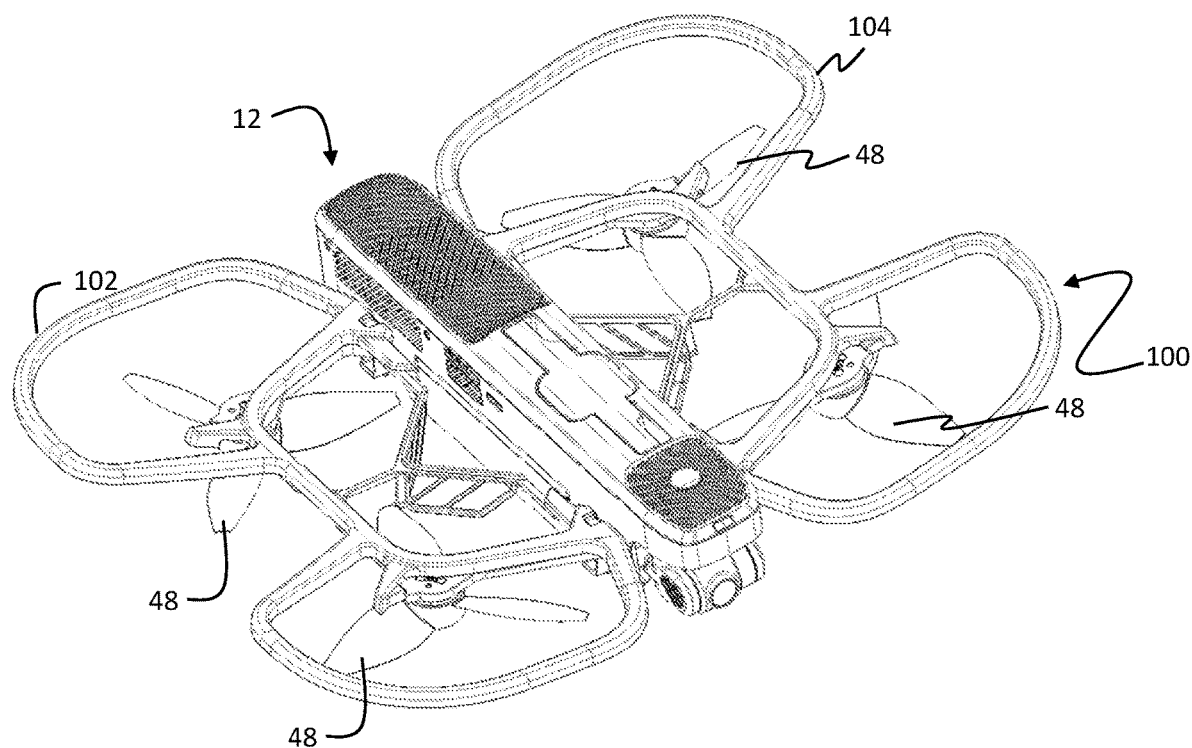
FIG. 37 is a perspective view of the semi-protective frame of FIG. 26 installed on the aerial system.
Figure 38:
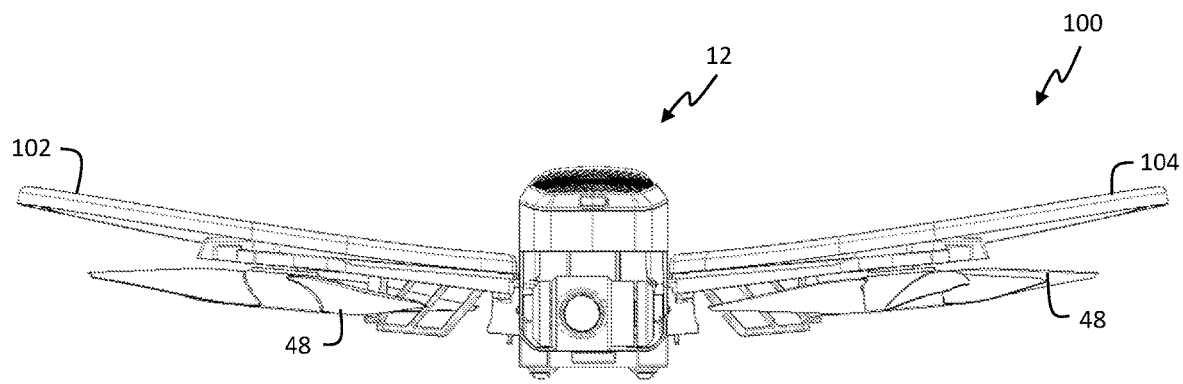
FIG. 38 is a front view of the semi-protective frame of FIG. 26 installed on the aerial system.
Figure 39:
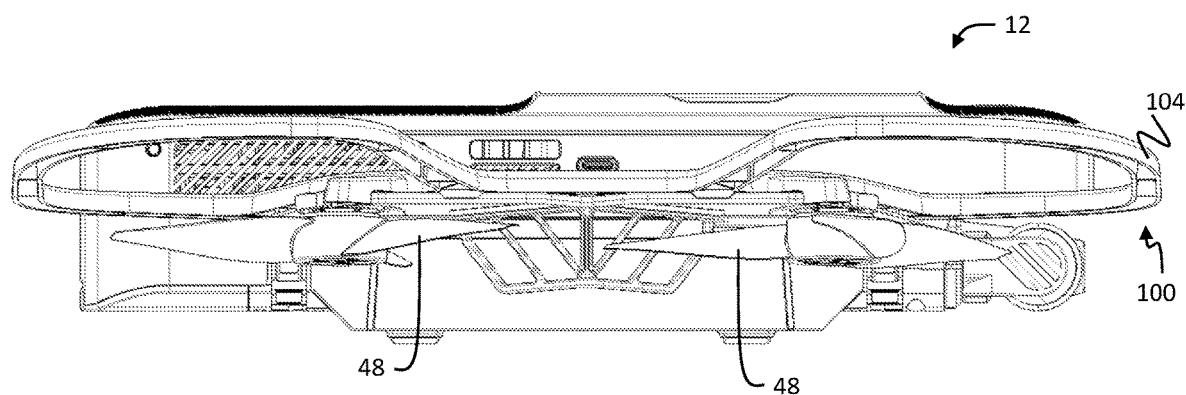
FIG. 39 is a side view of the semi-protective frame of FIG. 26 installed on the aerial system.

Referring to FIGS. 34-36, the detachable protective structure 42 of FIG. 18 includes at least one folding mechanism 126. In one embodiment, two folding mechanisms 126 are used for each side of the aerial system 12. The folding mechanism 126 includes a first or front and second or rear splint 128 and 130, each having a pair of shaft holes 132 extending therethrough, and a first or left rotating shaft 134 and a second or right rotating shaft 136. The folding mechanism 126 uses a sandwich structure—the left and right rotating shafts 132 and 134, respectively, are clamped in the middle by the front and rear splints 128 and 130, respectively, and the positioning is matched through the shaft holes 132. The folding mechanism 126 also includes a first or left shaft magnet 138 on the left rotating shaft 134 and a second or right shaft magnet 140 on the right rotating shaft 136, which is used to attach the unfolded shaft to the body 20 of the aerial system 12, to ensure the rotating shafts 134 and 136 will not fold back automatically after being unfolded. It should be appreciated that the synchronous rotation is meshed through gears.

Although omitted for conciseness, the preferred embodiments include every combination and permutation of the various system components and the various method processes, wherein the method processes can be performed in any suitable order, sequentially or concurrently.

As a person skilled in the art will recognize from the previous detailed description and from the figures and claims, modifications and changes can be made to the preferred embodiments of the invention without departing from the scope of this invention defined in the following claims.

What is claimed is:

1. An assembly for an aerial system, comprising:
a body having a first side and a second side;
a first wing support including one of at least one first positioning hook and at least one first positioning groove;
a first folding mechanism coupled between the first wing support and the first side of the body to allow the first wing support to rotate relative to the body;
a second wing support including one of at least one second positioning hook and at least one second positioning groove;
a second folding mechanism coupled between the second wing support and the second side of the body to allow the second wing support to rotate relative to the body, wherein each of the first and second wing supports are rotatable between an expansion state and a folding state;
a first protection structure coupled to the first wing support and disposed over propellers coupled to the first wing support, the first protection structure including another one of the least one first positioning hook and the least one first positioning groove, wherein the first wing support and the first protection structure are fixed relative to each other by the least one first positioning hook and the at least one first positioning groove;
a second protection structure coupled to the second wing support and disposed over propellers coupled to the second wing support, the second protection structure including another one of the least one second positioning hook and the least one second positioning groove, wherein the second wing support and the second protection structure are fixed relative to each other by the least one second positioning hook and the at least one second positioning groove;
a first Hall effect sensor coupled to the first wing support and protection structure and the first side of the body; and
a second Hall effect sensor coupled to the second wing support and protection structure and the second side of the body, each of the first and second Hall effect sensors having a first state and a second state corresponding to the expansion state and the folding state, respectively, of the first and second wing support.

2. The assembly for an aerial system as set forth in claim 1 wherein each of first and second protection structures comprise a first protection frame and a second protection frame extending along a propeller rotational plane of the respective propellers and arranged along the respective first and second side of the body.

3. The assembly for an aerial system as set forth in claim 2 wherein the first and second protection frames extend along the respective first and second side of the body, along a bottom of the propellers, along a top of the propellers, along the top and bottom of the propellers, or encapsulate the propellers.

4. The assembly for an aerial system as set forth in claim 2 wherein the first and second protection frames include at least one airflow aperture fluidly connecting the propellers to an ambient environment to enable a flow of air between the ambient environment and the propellers.

5. The assembly for an aerial system as set forth in claim 1 wherein each folding mechanism includes front and rear splints, a pair of shaft holes extending through the front and rear splints, and left and right rotating shafts, wherein the left and right rotating shafts are clamped by the front and rear splints.

6. The assembly for an aerial system as set forth in claim 1 wherein the first and second protection frames are detachable from the first and second wing supports, respectively.

7. The assembly for an aerial system as set forth in claim 1 including a plurality of magnets embedded in at least one of the first and second protection frames and the first and second wing supports.

8. The assembly for an aerial system as set forth in claim 1 including a first clip and a second clip, the first protection structure and the first wing support attached together by the first clip, the second protection structure and the second wing support attached together by the second clip.

9. The assembly for an aerial system as set forth in claim 8 wherein the first and second clips have one of a "Y" shape, "V" shape, quadrangle shape, and pentagon shape.

10. A lift mechanism for an aerial system comprising:
a body having a first side and a second side;
a first folding mechanism connected to the first side of the body of the aerial system;
a first wing support including one of at least one first positioning hook and at least one first positioning groove, the first folding mechanism coupled between the first wing support and the first side of the body to allow the first wing support to rotate relative to the body;
a first propeller blade and a first motor coupled to the first wing support;
a first protection structure disposed over the first propeller blade and removably attached to the first wing support, the first protection structure including another one of the least one first positioning hook and the least one first positioning groove, wherein the first wing support and the first protection structure are fixed relative to each other by the least one first positioning hook and the at least one first positioning groove;
a second wing support including one of at least one second positioning hook and at least one second positioning groove;
a second propeller blade and a second motor coupled to the second wing support;

a second folding mechanism coupled between the second wing support and the second side of the body to allow the second wing support to rotate relative to the body, wherein each of the first and second wing supports are rotatable between an expansion state and a folding state;

a second protection structure disposed over the second propeller blade and removably attached to the second wing support, the second protection structure including another one of the least one second positioning hook and the least one second positioning groove, wherein the second wing support and the second protection structure are fixed relative to each other by the least one second positioning hook and the at least one second positioning groove;

a first Hall effect sensor coupled to the first wing support and protection structure and the first side of the body; and a second Hall effect sensor coupled to the second wing support and protection structure and the second side of the body, each of the first and second Hall effect sensors having a first state and a second state corresponding to the expansion state and the folding state, respectively of the first and second wing support.

11. The lift mechanism for an aerial system as set forth in claim 10 wherein each of the first and second protection structures comprise a first protection frame and a second protection frame extending along a propeller rotational plane of the propellers and arranged along the first and second side of the body.

12. The lift mechanism for an aerial system as set forth in claim 11 wherein the first and second protection frames extend along the respective first and second side of the body, along a bottom of the propellers, along a top of the propellers, along the top and bottom of the propellers, or encapsulate the propellers.

13. The lift mechanism for an aerial system as set forth in claim 11 wherein the first and second protection frames include at least one airflow aperture fluidly connecting the respective propeller blade to an ambient environment to enable a flow of air between the ambient environment and the respective propeller blade.

14. The lift mechanism for an aerial system as set forth in claim 10 wherein the first and second protection frames are detachable from the first and second wing supports, respectively.

15. The lift mechanism for an aerial system as set forth in claim 10 including a plurality of magnets embedded in the first and second protection structures and the first and second wing supports.

16. The lift mechanism for an aerial system as set forth in claim 10 including a first clip to attach the first protection structure and the first wing support together and a second clip to attach the second protection structure and the second wing support together.

17. The lift mechanism for an aerial system as set forth in claim 16 wherein the first and second clips have one of a "Y" shape, "V" shape, quadrangle shape, and pentagon shape.

18. The lift mechanism for an aerial system as set forth in claim 10 wherein each of the first and second folding mechanisms includes front and rear splints, a pair of shaft holes extending through the front and rear splints, and left and right rotating shafts, wherein the left and right rotating shafts are clamped by the front and rear splints.

* * * * *